(12) United States Patent
Stram et al.

(10) Patent No.: US 11,792,277 B2
(45) Date of Patent: *Oct. 17, 2023

(54) SIMILARITY PROFILE GENERATION AND USER PROFILE MODIFICATION

(71) Applicant: Yahoo Assets LLC, Dulles, VA (US)

(72) Inventors: Rotem Stram, Haifa (IL); Eliran Abutbul, Qiryat Atta (IL); Oren Shlomo Somekh, Cfar-Neter (IL); Yair Koren, Haifa (IL); Morelle Sheer Arian, Seattle, WA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,661

(22) Filed: Oct. 21, 2022

(65) Prior Publication Data

US 2023/0038736 A1 Feb. 9, 2023

Related U.S. Application Data

(63) Continuation of application No. 17/019,484, filed on Sep. 14, 2020, now Pat. No. 11,483,401.

(51) Int. Cl.
*H04L 67/306* (2022.01)
*G06F 16/9535* (2019.01)
*H04L 67/50* (2022.01)

(52) U.S. Cl.
CPC ........ *H04L 67/306* (2013.01); *G06F 16/9535* (2019.01); *H04L 67/535* (2022.05)

(58) Field of Classification Search
CPC .... H04L 67/306; H04L 67/22; G06F 16/9535
See application file for complete search history.

(56) References Cited

U.S. PATENT DOCUMENTS

| | | | |
|---|---|---|---|
| 8,468,143 B1 * | 6/2013 | Oztekin | G06F 16/90335 707/706 |
| 10,083,222 B1 * | 9/2018 | Katzer | G06F 16/951 |
| 11,483,401 B2 * | 10/2022 | Stram | H04L 67/306 |
| 2003/0074368 A1 * | 4/2003 | Schuetze | G06F 16/5846 707/E17.022 |
| 2012/0066359 A1 * | 3/2012 | Freeman | G06Q 30/0256 709/223 |
| 2018/0130156 A1 * | 5/2018 | Grau | G06Q 50/2057 |
| 2019/0311430 A1 * | 10/2019 | Raleigh | H04M 15/00 |

(Continued)

*Primary Examiner* — Oanh Duong
(74) *Attorney, Agent, or Firm* — Cooper Legal Group LLC

(57) ABSTRACT

One or more computing devices, systems, and/or methods are provided. Event information associated with a plurality of events may be identified. The plurality of events may be associated with client devices and entities. A network profile associated with the client devices and the entities may be generated based upon the event information. A similarity profile associated with the client devices may be generated based upon the network profile. The similarity profile may be indicative of one or more similarity scores associated with a first client device and one or more client devices. A user profile associated with the first client device may be modified, based upon the similarity profile and/or one or more user profiles associated with the one or more client devices, to generate a modified user profile. Content may be selected for presentation via the first client device based upon the modified user profile.

20 Claims, 13 Drawing Sheets

(56) References Cited

U.S. PATENT DOCUMENTS

| | | | | |
|---|---|---|---|---|
| 2019/0384469 A1* | 12/2019 | Lo | .................... | G06F 16/24578 |
| 2020/0183900 A1* | 6/2020 | Iska | ...................... | G06F 18/23 |
| 2021/0117396 A1* | 4/2021 | Iska | ...................... | G06N 3/084 |
| 2021/0224342 A1* | 7/2021 | Makani | ................ | H04L 67/306 |

* cited by examiner

SIMILARITY PROFILE GENERATION AND USER PROFILE MODIFICATION

RELATED APPLICATION

This application claims priority to and is a continuation of U.S. application Ser. No. 17/019,484, filed on Sep. 14, 2020, entitled "SIMILARITY PROFILE GENERATION AND USER PROFILE MODIFICATION", which is incorporated by reference herein in its entirety.

BACKGROUND

Many applications, such as websites, applications, etc. may provide platforms for viewing media. For example, a request for media may be received from a device associated with a user. Responsive to receiving the request for media, media may be transmitted to the device.

SUMMARY

In accordance with the present disclosure, one or more computing devices and/or methods are provided. In an example, activity of a first plurality of client devices may be analyzed to determine a first plurality of sets of event information associated with a first plurality of events of the activity. A first set of event information of the first plurality of sets of event information is associated with a first event of the first plurality of events. The first set of event information is indicative of a first client device, of the first plurality of client devices, associated with the first event, and/or a first entity, of a first plurality of entities associated with the first plurality of events, associated with the first event. A first network profile associated with the first plurality of client devices and the first plurality of entities may be generated based upon the first plurality of sets of event information. The first network profile is indicative of one or more first sets of event metrics associated with the first client device and one or more first entities, of the first plurality of entities, comprising the first entity. A first set of event metrics of the one or more first sets of event metrics corresponds to a measure of activity associated with the first client device and the first entity. A first similarity profile associated with the first client device may be generated based upon the first network profile. The first similarity profile is indicative of one or more first client devices, of the first plurality of client devices, wherein each client device of the one or more first client devices is associated with an entity of the one or more first entities. The first similarity profile is indicative of one or more first similarity scores associated with the first client device, wherein a first similarity score of the one or more first similarity scores corresponds to a similarity of the first client device to a second client device of the one or more first client devices. A first user profile associated with the first client device may be modified, based upon the first similarity profile and one or more first user profiles associated with the one or more first client devices, to generate a modified user profile. Content may be selected for presentation via the first client device based upon the modified user profile.

In an example, activity of a first plurality of client devices may be analyzed to determine a first plurality of sets of event information associated with a first plurality of events of the activity. A first set of event information of the first plurality of sets of event information is associated with a first event of the first plurality of events. The first set of event information is indicative of a first client device, of the first plurality of client devices, associated with the first event, and/or one or more first terms, of a first plurality of terms associated with the first plurality of events, associated with the first event. A first network profile associated with the first plurality of client devices and the first plurality of terms may be generated based upon the first plurality of sets of event information. The first network profile is indicative of one or more first sets of event metrics associated with the first client device and one or more second terms, of the first plurality of terms, comprising the one or more first terms. A first set of event metrics of the one or more first sets of event metrics corresponds to a measure of activity associated with the first client device and a first term of the one or more second terms. A first similarity profile associated with the first client device may be generated based upon the first network profile. The first similarity profile is indicative of one or more first client devices, of the first plurality of client devices, wherein each client device of the one or more first client devices is associated with a term of the one or more second terms. The first similarity profile is indicative of one or more first similarity scores associated with the first client device, wherein a first similarity score of the one or more first similarity scores corresponds to a similarity of the first client device to a second client device of the one or more first client devices. A first user profile associated with the first client device may be modified, based upon the first similarity profile and one or more first user profiles associated with the one or more first client devices, to generate a modified user profile.

In an example, activity associated with a first plurality of users may be analyzed to determine a first plurality of sets of event information associated with a first plurality of events of the activity. A first set of event information of the first plurality of sets of event information is associated with a first event of the first plurality of events. The first set of event information is indicative of a first user, of the first plurality of users, associated with the first event, and/or a first entity, of a first plurality of entities associated with the first plurality of events, associated with the first event. A first network profile associated with the first plurality of users and the first plurality of entities may be generated based upon the first plurality of sets of event information. The first network profile is indicative of one or more first sets of event metrics associated with the first user and one or more first entities, of the first plurality of entities, comprising the first entity. A first set of event metrics of the one or more first sets of event metrics corresponds to a measure of activity associated with the first user and the first entity. A first similarity profile associated with the first user may be generated based upon the first network profile. The first similarity profile is indicative of one or more first users, of the first plurality of users, wherein each user of the one or more first users is associated with an entity of the one or more first entities. The first similarity profile is indicative of one or more first similarity scores associated with the first user, wherein a first similarity score of the one or more first similarity scores corresponds to a similarity of the first user to a second user of the one or more first users. A first user profile associated with the first user may be generated based upon the first similarity profile and one or more first user profiles associated with the one or more first users. Content may be selected for presentation to the first user based upon the first user profile.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
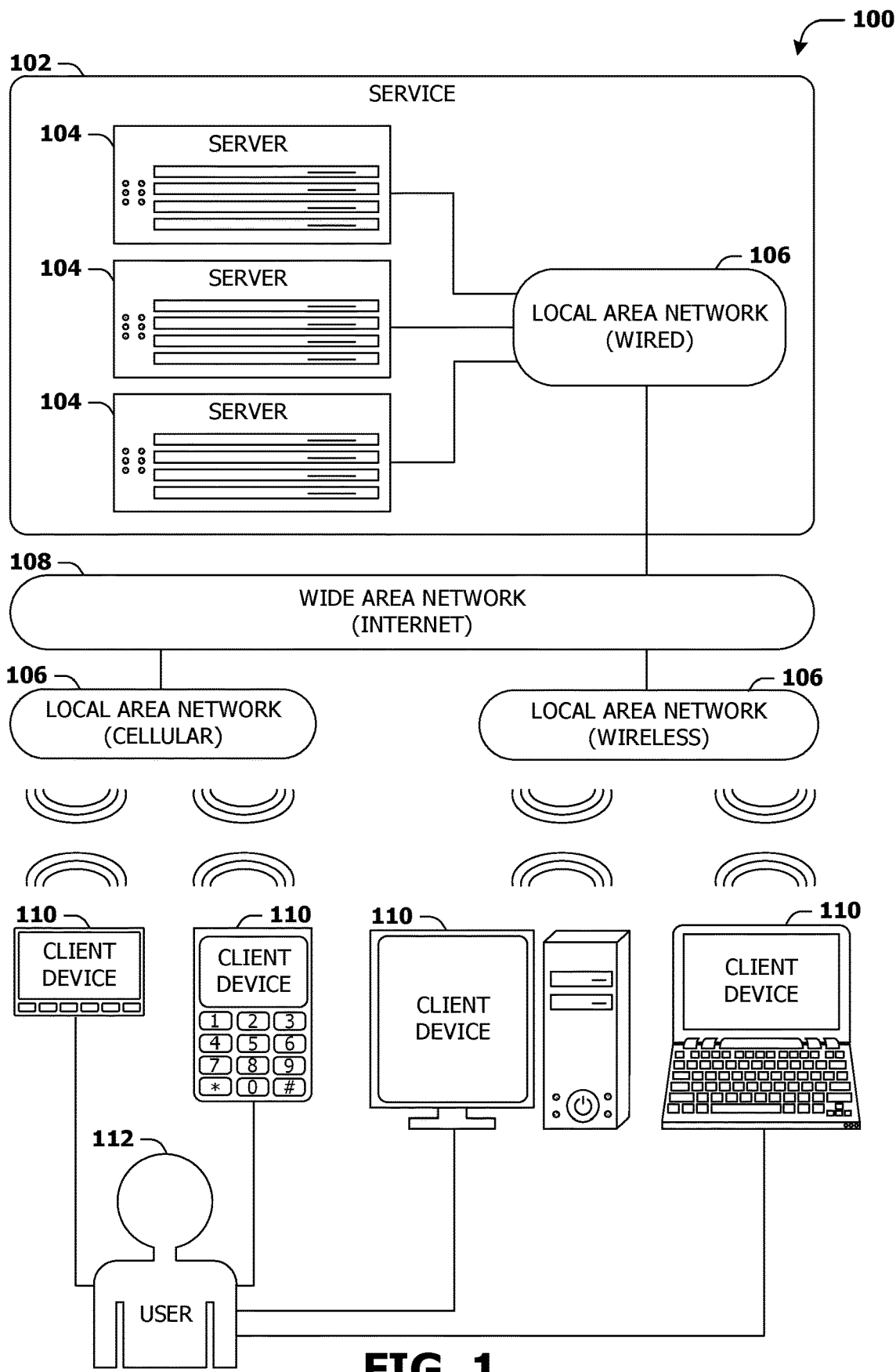
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
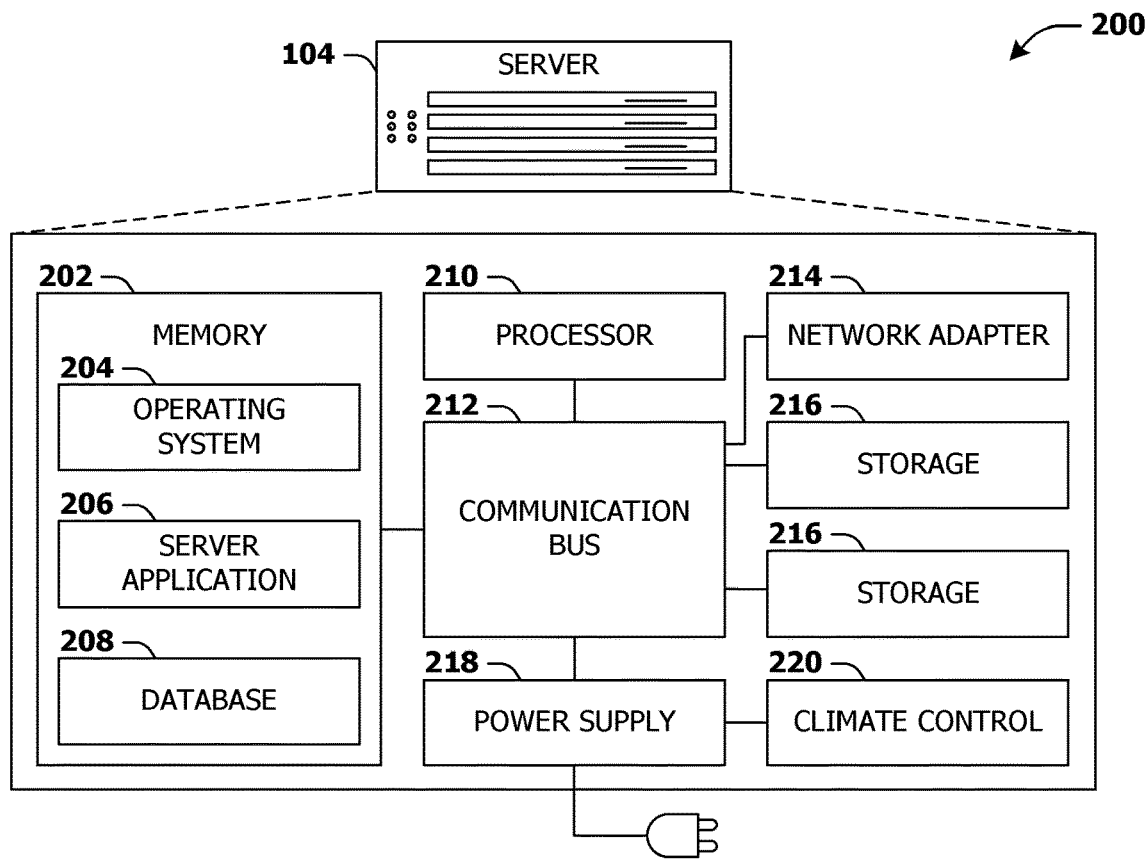
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
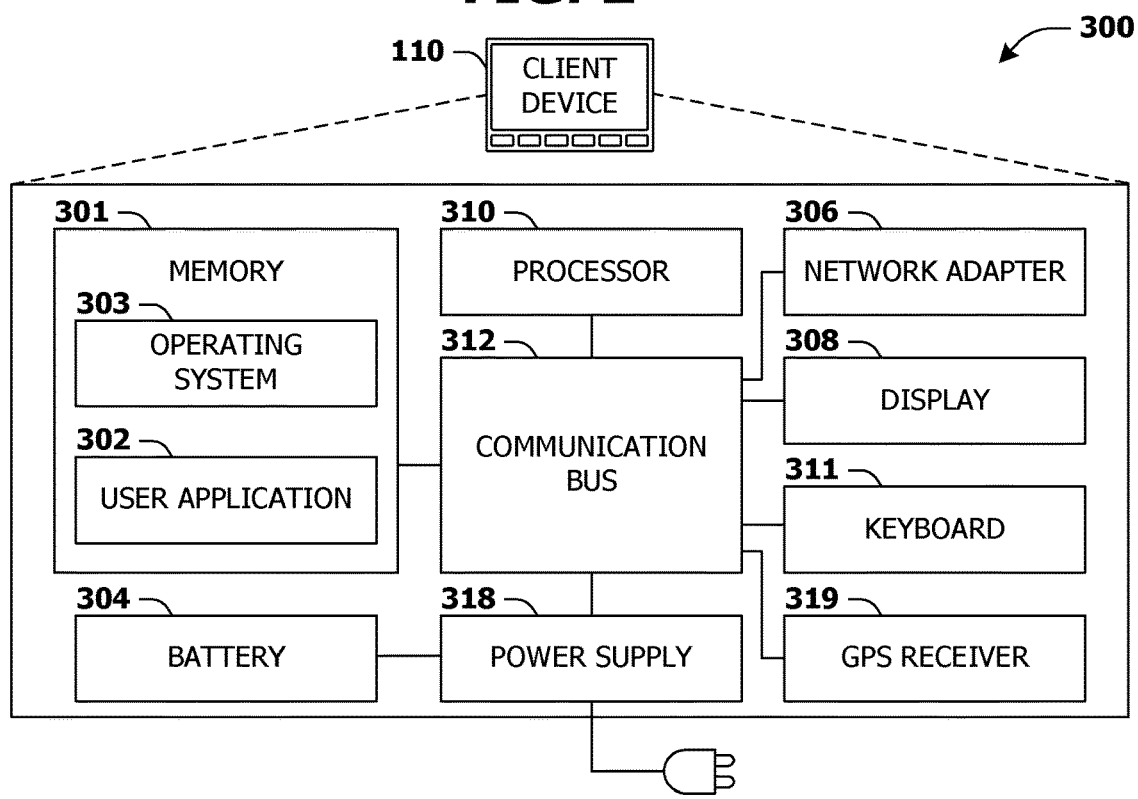
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a similarity profile and/or modifying a user profile based upon the similarity profile are provided. A content system may use user information associated with a client device and/or a user to select content for presentation via the client device (to the user). For example, the user information may comprise activity information stored in a user profile associated with the client device and/or the user. It may be beneficial to supplement the user information associated with the client device (and/or the user) with information from user profiles of client devices and/or users that are determined to be similar to the client device and/or the user (such as in a scenario in which the user information does not comprise, or comprise minimal amounts of, one or more types of user information, such as selections of content items). By supplementing the user information with supplemental information from other user profiles, content may be more accurately selected for presentation via the client device (such as due to the increased amount of available user information associated with the client device). Alternatively and/or additionally, by supplementing the user information with the supplemental information and/or selecting content for presentation via the client device (to the user) based upon the supplemental information, a probability that the user of the client device is interested in the content and/or interacts with the content increases.

Thus, in accordance with one or more of the techniques presented herein, activity of a first plurality of client devices may be analyzed to determine a first plurality of sets of event information associated with a first plurality of events of the activity. A first set of event information of the first plurality of sets of event information is associated with a first event of the first plurality of events. The first set of event information is indicative of a first client device, of the first plurality of client devices, associated with the first event, and/or a first entity, of a first plurality of entities associated with the first plurality of events, associated with the first event. A first network profile associated with the first plurality of client devices and the first plurality of entities may be generated based upon the first plurality of sets of event information. The first network profile is indicative of one or more first sets of event metrics associated with the first client device and one or more first entities, of the first plurality of entities, comprising the first entity. A first set of event metrics of the one or more first sets of event metrics corresponds to a measure of activity associated with the first client device and the first entity. A first similarity profile associated with the first client device may be generated based upon the first network profile. The first similarity profile is indicative of one or more first client devices, of the first plurality of client devices, wherein each client device of the one or more first client devices is associated with an entity of the one or more first entities. The first similarity profile is indicative of one or more first similarity scores associated with the first client device, wherein a first similarity score of the one or more first similarity scores corresponds to a similarity of the first client device to a second client device of the one or more first client devices. A first user profile associated with the first client device may be modified, based upon the first similarity profile and one or more first user profiles associated with the one or more first client devices, to generate a modified user profile. Content may be selected for presentation via the first client device based upon the modified user profile.

Figure 4:
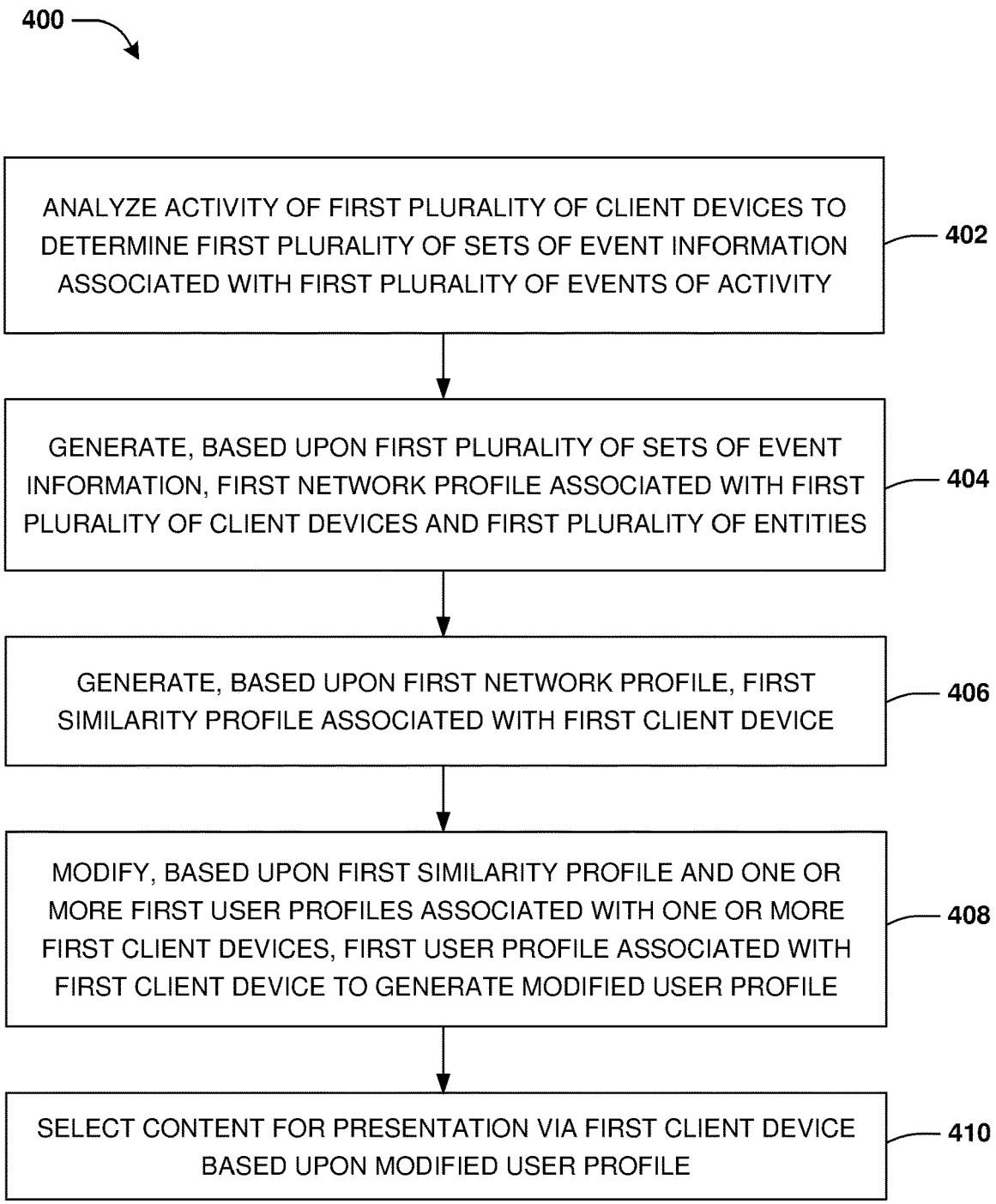
FIG. 4 is a flow chart illustrating an example method for generating a similarity profile and/or modifying a user profile based upon the similarity profile.

An embodiment of generating a similarity profile and/or modifying a user profile based upon the similarity profile is illustrated by an example method 400 of FIG. 4. A content system for presenting content via devices may be provided.

In some examples, the content system may be an advertisement system (e.g., an online advertising system). Alternatively and/or additionally, the content system may not be an advertisement system. In some examples, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may be associated with content other than and/or in addition to advertisements. For example, the content system may correspond to a media platform for presenting at least one of articles (e.g., news articles, blog articles, analyses, etc.), videos (e.g., movies, video clips, etc.), audio files (e.g., music, podcasts, audio books, etc.), images, etc. Alternatively and/or additionally, the content system may correspond to a social media platform and/or a communication platform.

At 402, activity of a first plurality of client devices may be analyzed to determine a first plurality of sets of event information associated with a first plurality of events of the activity. A first set of event information of the first plurality of sets of event information may be associated with a first event of the first plurality of events. For example, the first set of event information may be indicative of a first client device, of the first plurality of client devices, associated with the first event. Alternatively and/or additionally, the first set of event information may be indicative of a first entity, of a first plurality of entities associated with the first plurality of events, associated with the first event. In some examples, the first plurality of events may correspond to events that occur within a first period of time. For example, the activity of the first plurality of client devices (analyzed to identify the first plurality of events and/or to determine the first plurality of sets of event information) may occur within the first period of time.

In some examples, an entity of the first plurality of entities may be associated with an internet resource, such as at least one of a web page, a website, an application (e.g., a client application, a mobile application, a platform, etc.), an article, a video, an audio file, an image, a web page, an advertisement, an email, a message, etc. In some examples, an event of the first plurality of events (and/or each event of the first plurality of events) may correspond to activity performed by a client device of the first plurality of client devices in association with an entity of the first plurality of entities.

In an example, the first plurality of entities may correspond to a first plurality of terms. The first entity (associated with the first event) may correspond to a first term of the first plurality of terms. For example, the first term may comprise a combination of one or more characters, such as comprising at least one of one or more letters, one or more symbols, one or more numbers, etc. In some examples, the first term (and/or each term of the first plurality of terms) may be at least a portion of a web address (e.g., a uniform resource locator (URL)). For example, the first event may correspond to the first client device accessing and/or displaying a first internet resource having a first web address comprising the first term.

In some examples, web addresses associated with internet resources accessed via the first plurality of client devices may be analyzed to identify the first plurality of terms. For example, the first web address associated with the first internet resource may be analyzed to identify one or more first terms, comprising the first term, of the first web address.

The one or more first terms of the first web address may be identified by performing field-based term identification. Field-based term identification may be performed by identifying one or more fields of the first web address and/or identifying the one or more first terms based upon the one or more fields. The one or more fields may comprise at least one of a domain field of the first web address, a path field of the first web address, a query field of the first web address, a fragment field of the first web address, etc.

In an example, the domain field may comprise multiple labels concatenated by one or more period "." characters (e.g., a domain field corresponding to "www.clothesworld.com" comprises labels "www", "clothesworld" and "com" split by period "." characters). The first web address may be analyzed to identify the domain field. The multiple labels of the domain field may be identified based upon period "." characters within the domain field. A term of the one or more first terms may correspond to a label of the multiple labels of the domain field (e.g., "clothesworld"). Alternatively and/or additionally, a term of the one or more first terms may correspond to the domain field (e.g., "www.clothesworld.com").

Alternatively and/or additionally, the path field of the first web address may comprise one or more path labels (e.g., directories and/or filenames). One or more first characters (e.g., at least one of a forward slash "/" character, a space " " character, a dash "-" character, a semicolon ";" character, etc.) may be used to separate the path field from a preceding field (e.g., the domain field) of the first web address and/or to separate path labels of the path field from each other. In some examples, the first web address may be analyzed (such as based upon the one or more first characters) to identify the path field and/or the one or more path labels of the path field. In an example where the first web address comprises "www.clothesworld.com/fall-collection/circle-up-black-white-shirt.html", the path field may be identified based upon the forward slash "/" character separating the domain field (e.g., "www.clothesworld.com") from the path field "fall-collection/circle-up-black-white-shirt.html". Alternatively and/or additionally, path labels of the path field may be identified based upon a forward slash "/" character and/or dash "-" characters within the path field (e.g., the path labels may comprise "fall", "collection", "circle", etc.). A term of the one or more first terms may correspond to a path label of the path field. Alternatively and/or additionally, a term of the one or more first terms may correspond to the path field.

Alternatively and/or additionally, the query field of the first web address may comprise one or more query labels (e.g., query parameters, query values, and/or query parameter-value pairs). One or more second characters (e.g., an ampersand "&" character) may be used to separate query labels of the query field from each other. In an example, the query field (e.g., "color=black & cgid=mens") may comprise a first query label (e.g., "color=black") and a second query label (e.g., "cgid=mens") separated by an ampersand "&" character. The first query label may comprise a first query parameter (e.g., color) and a first query value (e.g., black). The second query label may comprise a second query parameter (e.g., category identifier) and a second query value (e.g., mens). The first web address may be analyzed to identify the query field (such as based upon a question mark "?" character preceding the query field) and/or the one or more query labels of the query field (such as based upon one or more ampersand "&" characters within the first web address). A term of the one or more first terms may correspond to a query label (e.g., "color=black" and/or "cgid=mens") of the query field. Alternatively and/or additionally, a term of the one or more first terms may correspond to a query parameter of a query label of the query field. Alternatively and/or additionally, a term of the one or more first terms may correspond to a query value of a query label of the query field. Alternatively and/or additionally, a term of the one or more first terms may correspond to the query field.

Alternatively and/or additionally, the fragment field of the first web address may comprise one or more fragment parameters associated with the first internet resource. The fragment field may be preceded by a character (e.g., a hash mark "#" character). The first web address may be analyzed to identify the fragment field (such as based upon a hash mark "#" character preceding the fragment field) and/or the one or more fragment parameters (such as based upon an ampersand "&" character and/or a forward slash "/" character between two fragment parameters of the fragment field). A term of the one or more first terms may correspond to a fragment parameter of the fragment field. Alternatively and/or additionally, a term of the one or more first terms may correspond to the fragment field.

Alternatively and/or additionally, the one or more first terms of the first web address may be identified by splitting the first web address on one or more characters within the first web address. In some examples, the one or more characters correspond to non-alphanumeric characters. In an example where the first web address comprises "www-.clothesworld.com/fall-collection/circle-up-black-white-shirt.html?color=black&cgid=mens", the first web address may be split on non-alphanumeric characters into terms "www", "clothesworld", "com", "fall", "collection", "circle", "up", "black", "white", "shirt", "html", "color", "black", "cgid" and "mens". The one or more first terms may comprise one or more of the terms.

In an example where the first plurality of entities corresponds to the first plurality of terms, the first set of event information associated with the first event may be indicative of the one or more first terms associated with the first web address. Alternatively and/or additionally, each set of event information of the first plurality of sets of event information may comprise one or more terms, of the first plurality of terms, associated with an internet resource associated with the set of event information.

Alternatively and/or additionally, the first plurality of entities may correspond to a first plurality of web pages. For example, the first entity (associated with the first event) may correspond to a first web page of the first plurality of web pages. The first set of event information associated with the first event may be indicative of an identifier of the first web page (such as a web address of the first web page) that can be used to identify the first web page (such as for generation of a first network profile and/or a first similarity profile discussed below).

Alternatively and/or additionally, the first plurality of entities may correspond to a first plurality of content items (e.g., the first plurality of content items may comprise at least one of a plurality of articles, a plurality of videos, a plurality of audio files, a plurality of images, a plurality of advertisements, etc.). For example, the first entity (associated with the first event) may correspond to a content item of the first plurality of content items. The first set of event information associated with the first event may be indicative of an identifier of the content item (such as at least one of a web address, a filename, a title, etc. of the content item) that can be used to identify the content item (such as for generation of a first network profile and/or a first similarity profile discussed below).

Alternatively and/or additionally, the first plurality of entities may correspond to a first plurality of queries (e.g., queries associated with searches performed using one or more search engines). For example, the first entity (associated with the first event) may correspond to a first query (e.g., the first query may comprise a combination of one or more characters, such as comprising at least one of one or more letters, one or more symbols, one or more numbers, etc.) used to perform a search using a search engine. The first set of event information associated with the first event may be indicative of the first query.

Alternatively and/or additionally, the first plurality of entities may correspond to a first plurality of emails. For example, the first entity (associated with the first event) may correspond to a first email of the first plurality of emails. The first set of event information associated with the first event may be indicative of an identifier of the first email that can be used to identify the first email (such as for generation of a first network profile and/or a first similarity profile discussed below).

Alternatively and/or additionally, the first plurality of entities may correspond to a first plurality of email accounts. For example, the first entity (associated with the first event) may correspond to a second email account of the first plurality of email accounts. The first set of event information associated with the first event may be indicative of an identifier of the second email account, such as an email address, that can be used to identify the second email account (such as for generation of a first network profile and/or a first similarity profile discussed below).

Alternatively and/or additionally, the first plurality of entities may correspond to a first plurality of social media posts. For example, the first entity (associated with the first event) may correspond to a first social media post of the first plurality of social media posts. The first set of event information associated with the first event may be indicative of an identifier of the first social media post that can be used to identify the first social media post (such as for generation of a first network profile and/or a first similarity profile discussed below).

Alternatively and/or additionally, the first plurality of entities may correspond to a first plurality of social media accounts. For example, the first entity (associated with the first event) may correspond to a second social media account of the first plurality of social media accounts. The first set of event information associated with the first event may be indicative of an identifier of the second social media account, such as a social media username, that can be used to identify the second social media account (such as for generation of a first network profile and/or a first similarity profile discussed below).

At 404, a first network profile associated with the first plurality of client devices and the first plurality of entities may be generated based upon the first plurality of sets of event information. In some examples, the first network profile is indicative of event metrics associated with client devices of the first plurality of client devices and/or entities of the first plurality of entities, such as a rate at which events associated with a client device of the first plurality of client devices and an entity of the first plurality of entities occur, and/or a quantity of events associated with the client device and the entity.

In some examples, the first network profile is indicative of one or more first sets of event metrics associated with the first client device and one or more first entities, of the first plurality of entities, comprising the first entity. In some examples, the one or more first sets of event metrics may be determined based upon the first plurality of sets of event information. For example, the first plurality of sets of event information may comprise one or more first sets of event information associated with the first client device and/or the one or more first entities. For example, the one or more first sets of event information may be indicative of one or more first events (comprising the first event) of the first plurality of events. The one or more first sets of event metrics may be determined based upon the one or more first sets of event information. A first set of event metrics of the one or more first sets of event metrics may correspond to a measure of activity associated with the first client device and the first entity. The activity associated with the first client device and the first entity may comprise the first event.

Alternatively and/or additionally, the one or more first sets of event information and/or the one or more first sets of event metrics may be associated with multiple client devices. For example, a first set of client devices, comprising the first client device, may be associated with a first user account associated with a service (e.g., each client device of the first set of client devices may be logged into the first user account associated with the service, such as at least one of a media platform, a communication platform, a social media platform, etc. associated with the content system, for example). The one or more first sets of event information may be indicative of events performed by the first set of client devices associated with the first user account. For example, activity performed by the first set of client devices may be analyzed to determine the one or more first sets of event information and/or the one or more first sets of event metrics may be determined based upon the one or more first sets of event information determined based upon the activity of the first set of client devices. In an example, the first set of event metrics may correspond to a measure of activity associated with the first set of client devices and the first entity.

In an example where the first plurality of entities corresponds to the first plurality of terms associated with web addresses of internet resources and/or the first entity corresponds to the first term, an event associated with the first client device and the first entity (such as the first event and/or one or more other events associated with the first client device and the first entity) may correspond to an internet resource, having a web address comprising the first term, being accessed by the first client device. Alternatively and/or additionally, an event associated with the first client device and the first entity may correspond to a presentation of a threshold proportion of an internet resource having a web address comprising the first term.

In an example where the first plurality of entities corresponds to the first plurality of web pages and/or the first entity corresponds to the first web page, an event associated with the first client device and the first entity (such as the first event and/or one or more other events associated with the first client device and the first entity) may correspond to at least one of the first web page being accessed and/or presented via the first client device, a threshold proportion of the first web page being presented via the first client device, the first web page being selected via the first client device, etc.

In an example where the first plurality of entities corresponds to the first plurality of content items and/or the first entity corresponds to the content item, an event associated with the first client device and the first entity (such as the first event and/or one or more other events associated with the first client device and the first entity) may correspond to at least one of the content item being accessed and/or presented via the first client device, a threshold proportion of the content item being presented via the first client device, the content item being selected via the first client device, etc.

In an example where the first plurality of entities corresponds to the first plurality of queries and/or the first entity corresponds to the first query, an event associated with the first client device and the first entity (such as the first event and/or one or more other events associated with the first client device and the first entity) may correspond to the first query being entered into a search interface and/or a search (e.g., a search of one or more web pages) being performed by a search engine associated with the search interface to retrieve relevant search results associated with the first query.

In an example where the first plurality of entities corresponds to the first plurality of emails and/or the first entity corresponds to the first email, an event associated with the first client device and the first entity (such as the first event and/or one or more other events associated with the first client device and the first entity) may correspond to the first email being received by a first email account associated with the first client device. Alternatively and/or additionally, an event associated with the first client device and the first entity may correspond to the first email being transmitted by the first email account to one or more email accounts. Alternatively and/or additionally, an event associated with the first client device and the first entity may correspond to the first email being displayed and/or accessed via an email interface on the first client device. Alternatively and/or additionally, an event associated with the first client device and the first entity may correspond to the first email being marked as important and/or starred via the email interface on the first client device. Alternatively and/or additionally, an event associated with the first client device and the first entity may correspond to the first email being replied to via the email interface on the first client device.

In an example where the first plurality of entities corresponds to the first plurality of email accounts and/or the first entity corresponds to the second email account, an event associated with the first client device and the first entity (such as the first event and/or one or more other events associated with the first client device and the first entity) may correspond to an email from the second email account being received by the first email account associated with the first client device. Alternatively and/or additionally, an event associated with the first client device and the first entity may correspond to an email being transmitted by the first email account to one or more email accounts comprising the second email account. Alternatively and/or additionally, an event associated with the first client device and the first entity may correspond to an email from the second email account being displayed and/or accessed via the email interface on the first client device. Alternatively and/or additionally, an event associated with the first client device and the first entity may correspond to an email from the second email account being marked as important and/or starred via the email interface on the first client device.

In an example where the first plurality of entities corresponds to the first plurality of social media posts and/or the first entity corresponds to the first social media post, an event associated with the first client device and the first entity (such as the first event and/or one or more other events associated with the first client device and the first entity) may correspond to the first social media post being presented and/or accessed by the first client device and/or a first social media account associated with the first client device via a social media platform. Alternatively and/or additionally, an event associated with the first client device and the first entity may correspond to the first social media post being shared by the first social media account associated with the first client device with one or more social media accounts. Alternatively and/or additionally, an event associated with the first client device and the first entity may correspond to a reaction to the first social media post being exhibited on the social media platform on the first client device (e.g., the first social media post being liked). Alternatively and/or additionally, an event associated with the first client device and the first entity may correspond to a comment to the first social media post being posted on the social media platform on the first client device.

In an example where the first plurality of entities corresponds to the first plurality of social media accounts and/or the first entity corresponds to the second social media account, an event associated with the first client device and the first entity (such as the first event and/or one or more other events associated with the first client device and the first entity) may correspond to one or more social media posts posted by the second social media account being accessed by the first client device via the social media platform. Alternatively and/or additionally, an event associated with the first client device and the first entity may correspond to one or more social media posts posted by the second social media account being shared, by the first social media account associated with the first client device, with one or more social media accounts. Alternatively and/or additionally, an event associated with the first client device and the first entity may correspond to a reaction to a social media post posted by the second social media account being exhibited on the social media platform on the first client device (e.g., the social media post being liked). Alternatively and/or additionally, an event associated with the first client device and the first entity may correspond to a comment to a social media post posted by the second social media account being posted on the social media platform on the first client device.

Figure 5A:
FIG. 5A is a component block diagram illustrating an example system for generating a similarity profile and/or modifying a user profile based upon the similarity profile, where a first client device presents and/or accesses a first web page using a browser.
Figure 5B:
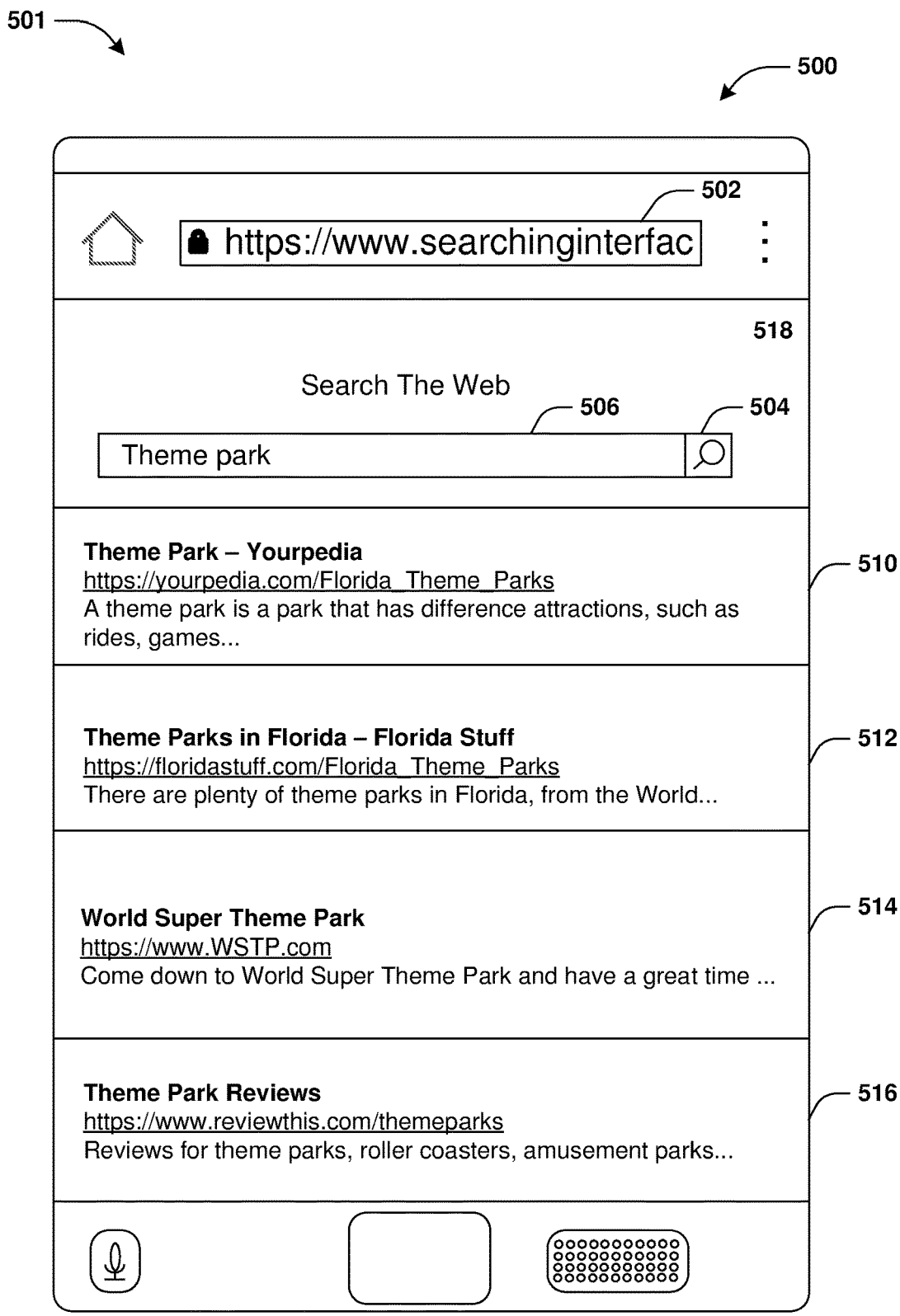
FIG. 5B is a component block diagram illustrating an example system for generating a similarity profile and/or modifying a user profile based upon the similarity profile, where a first client device presents a plurality of search results associated with a query.
Figure 5C:
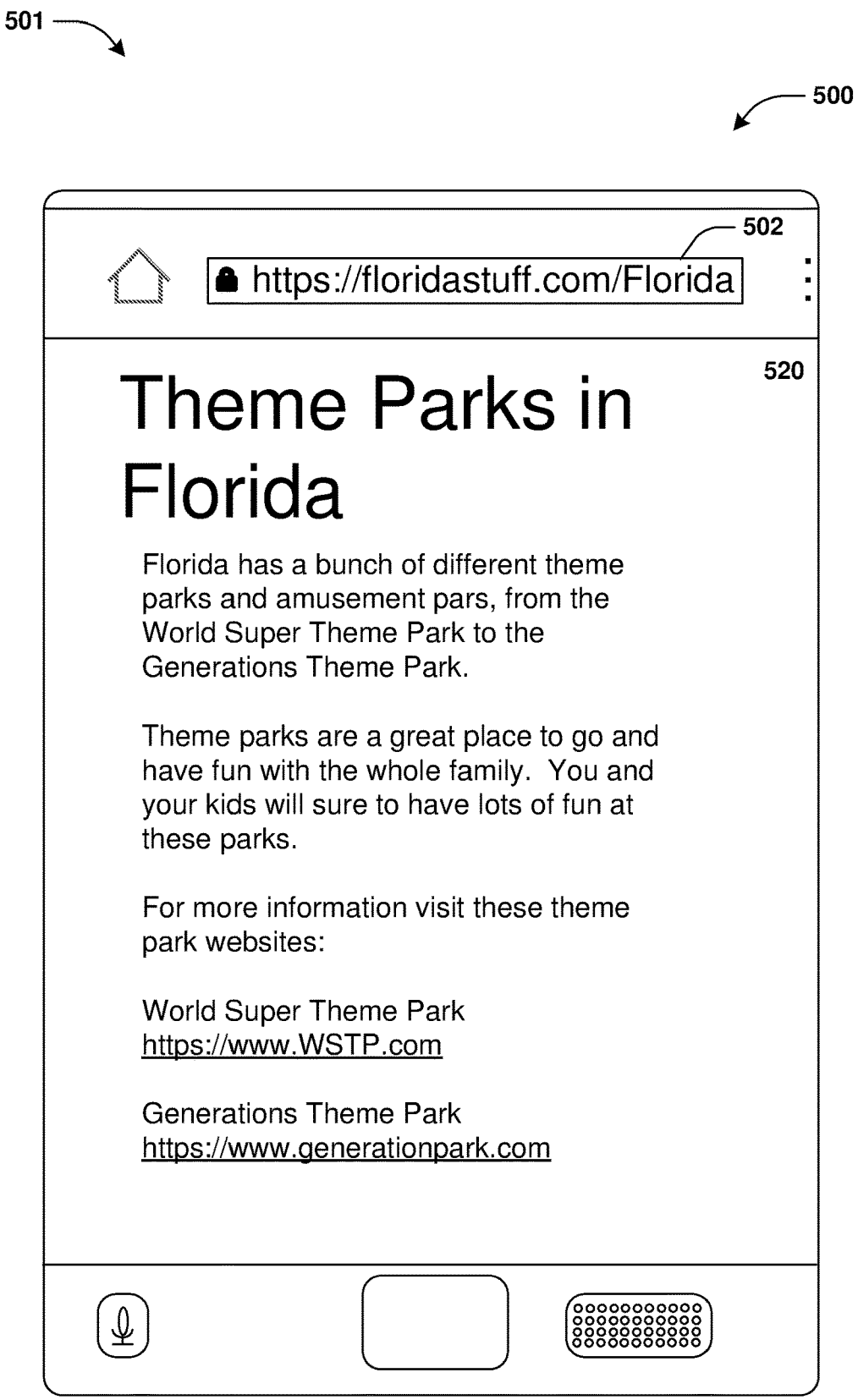
FIG. 5C is a component block diagram illustrating an example system for generating a similarity profile and/or modifying a user profile based upon the similarity profile, where a first client device presents and/or accesses a fourth web page.

FIGS. 5A-5I illustrate examples of a system 501 for generating a similarity profile and/or modifying a user profile based upon the similarity profile, described with respect to the method 400 of FIG. 4. FIGS. 5A-5C illustrate examples of events (of the one or more first events) associated with the first client device (shown with reference number 500) and/or examples of entities (of the one or more first entities) associated with the first client device 500.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "Theme Park" may be entered into the search field 506. In some examples, the first web page 508 may comprise a search selectable input 504 corresponding to performing a search based upon the query. For example, the search selectable input 504 may be selected.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to a fourth web page 520 (illustrated in FIG. 5C), a third search result 514 corresponding to a fifth web page and/or a fourth search result 516 corresponding to a sixth web page.

In some examples, responsive to the first client device 500 accessing and/or presenting the second web page 518, a set of event information of the one or more first sets of event information associated with the first client device 500 may be stored.

In an example, a set of event information of the one or more first sets of event information may be stored that is indicative of an entity (of the one or more first entities) corresponding to the query (e.g., "Theme park") and/or an event (of the one or more first events) corresponding to the query being entered into the search interface and/or the plurality of search results being determined and/or presented via the first client device 500.

Alternatively and/or additionally, a set of event information of the one or more first sets of event information may be stored that is indicative of an entity (of the one or more first entities) corresponding to the second web page 518 and/or an event (of the one or more first events) corresponding to the second web page 518 being accessed and/or presented via the first client device 500.

Alternatively and/or additionally, a set of event information of the one or more first sets of event information may be stored that is indicative of one or more entities (of the one or more first entities) corresponding to one or more terms of a web address associated with the second web page 518 and/or an event (of the one or more first events) corresponding to the second web page 518, having the web address comprising the one or more terms, being accessed and/or presented via the first client device 500. In an example, the web address associated with the second web page 518 may comprise "www.searchinginterface.com/search?q=Theme+park" and/or the one or more terms may comprise at least one of "www.searchinginterface.com", "searchinginterface", "Theme", "park", "Theme+park", etc.

In some examples, each search result of the plurality of search results may comprise a selectable input (e.g., a link) corresponding to accessing a web page associated with the search result. In some examples, the second search result 512 corresponding to the fourth web page 520 may be selected (e.g., the second search result 512 may be selected via a second selectable input corresponding to the second search result 512).

FIG. 5C illustrates the first client device 500 presenting and/or accessing the fourth web page 520 responsive to the selection of the second search result 512. In some examples, responsive to the first client device 500 accessing and/or presenting the fourth web page 520, a set of event information of the one or more first sets of event information associated with the first client device 500 may be stored.

In an example, a set of event information of the one or more first sets of event information may be stored that is indicative of an entity (of the one or more first entities) corresponding to the fourth web page 520 and/or an event (of the one or more first events) corresponding to the fourth web page 520 being accessed and/or presented via the first client device 500.

Alternatively and/or additionally, a set of event information of the one or more first sets of event information may be stored that is indicative of one or more entities (of the one or more first entities) corresponding to one or more terms of a web address associated with the fourth web page 520 and/or an event (of the one or more first events) corresponding to the fourth web page 520, having the web address comprising the one or more terms, being accessed and/or presented via the first client device 500. In an example, the web address associated with the fourth web page 520 may comprise "floridastuff.com/Florida_Theme_Parks" and/or the one or more terms may comprise at least one of "floridastuff.com", "floridastuff", "Florida", "Theme", "Parks", "Florida_Theme_Parks", etc.

The first set of event metrics may be indicative of a first event rate at which events associated with the first client device (and/or the first set of client devices) and the first entity occur, such as during the first period of time. In an example, the first event rate may correspond to a quantity of events associated with the first client device and the first entity per unit of time (e.g., per day, per week and/or per a different unit of time). In an example, the first event rate may correspond to five events per day (e.g., on average, five events associated with the first client device and the first entity may occur per day). Alternatively and/or additionally, the first set of event metrics may be indicative of a first quantity of events associated with the first client device (and/or the first set of client devices) and the first entity, such as during the first period of time. In an example, the first event rate may be determined based upon a duration of the first period of time and/or the first quantity of events associated with the first client device and the first entity. In some examples, the first set of event metrics may be indicative of a first entity weight associated with the first entity and the first client device. For example, the first entity weight may be determined based upon the first event rate and/or a rate of total events. The rate of total events may correspond to a rate at which events associated with the first client device (e.g., the events may comprise some and/or all events, of the first plurality of events, that are performed by the first client device and/or the first set of client devices) are performed by the first client device (and/or the first set of client devices) per unit of time. In an example, the rate of total events may correspond to 500 events (of the first plurality of events, for example) that are performed by the first client device per day. One or more operations (e.g., mathematical operations) may be performed using the first event rate and/or the rate of total events to determine the first entity weight (e.g., the first entity weight may be equal to the first event rate divided by the rate of total events). In an example where the first event rate corresponds to five events associated with the first client device and the first entity per day and the rate of total events corresponds to 500 events per day, the first entity weight may be 0.01 (e.g., 5 divided by 500). Alternatively and/or additionally, the first entity weight may be determined based upon the first quantity of events associated with the first entity and/or a quantity of total events associated with the first client device and/or the first set of client devices (e.g., the total events may comprise some and/or all events, of the first plurality of events, that are performed by the first client device and/or the first set of client devices, such as during the first period of time). One or more operations (e.g., mathematical operations) may be performed using the first quantity of events and/or the quantity of total events to determine the first entity weight (e.g., the first entity weight may be equal to the first quantity of events divided by the quantity of total events).

Alternatively and/or additionally, in a scenario in which the first entity corresponds to the first term, the first set of event metrics may be indicative of a first rate of occurrences of the first term in web addresses of internet resources accessed by the first client device (and/or the first set of client devices) per unit of time. In an example, the first rate of occurrences of the first term may correspond to five occurrences of the first term in web addresses of internet resources accessed by the first client device per day. Alternatively and/or additionally, the first set of event metrics may be indicative of a first quantity of occurrences of the first term in web addresses of internet resources accessed by the first client device (and/or the first set of client devices) during the first period of time. In some examples, the first set of event metrics may be indicative of a first term weight associated with the first term. For example, the first term weight may be determined based upon the first rate of occurrences of the first term and/or a first rate of total occurrences of terms. The first rate of total occurrences of terms may correspond to a first rate of occurrences of terms (e.g., terms of the first plurality of terms) in web addresses of internet resources accessed by the first client device per unit of time. In an example, the first rate of total occurrences of terms may correspond to 500 occurrences of terms (of the first plurality of terms) in web addresses of internet resources accessed by the first client device per day. The first rate of total occurrences of terms may count repeated occurrences of terms (e.g., in a scenario in which multiple internet resources accessed by the first client device have web addresses comprising the same term, each occurrence of the same term may be counted in determining the first rate of total occurrences of terms). One or more operations (e.g., mathematical operations) may be performed using the first rate of occurrences of the first term and/or the first rate of total occurrences of terms to determine the first term weight (e.g., the first term weight may be equal to the first rate of occurrences of the first term divided by the first rate of total occurrences of terms). In an example where the first rate of occurrences of the first term corresponds to five occurrences of the first term per day and the first rate of total occurrences of terms corresponds to 500 occurrences of terms per day, the first term weight may be 0.01 (e.g., 5 divided by 500). Alternatively and/or additionally, the first term weight may be determined based upon the first quantity of occurrences of the first term during the first period of time and/or a first quantity of total occurrences of terms (e.g., terms of the first plurality of terms) in web addresses of internet resources accessed by the first client device (and/or the first set of client devices) during the first period of time. The first quantity of total occurrences of terms may be determined by analyzing web addresses of internet resources accessed by the first client device (and/or the first set of client devices). The first quantity of total occurrences of terms may count repeated occurrences of terms (e.g., in a scenario in which multiple internet resources accessed by the first client device have web addresses comprising the same term, each occurrence of the same term may be counted in determining the first quantity of total occurrences of terms). One or more operations (e.g., mathematical operations) may be performed using the first quantity of occurrences of the first term during the first period of time and/or the first quantity of total occurrences of terms to determine the first term weight (e.g., the first term weight may be equal to the first quantity of occurrences of the first term divided by the first quantity of total occurrences of terms).

In some examples, the one or more first entities associated with the one or more first sets of event metrics may comprise entities, of the first plurality of entities, with which the first client device (and/or the first set of client devices) performed at least one event of the first plurality of events (during the first period of time). For example, the first plurality of sets of event information may be analyzed based upon the first client device to identify the one or more first entities with which the first client device performed at least one event of the first plurality of events. For example, the first plurality of sets of event information may be analyzed based upon first identification information associated with the first client device to identify the one or more first entities. The first identification information may comprise at least one of a device identifier associated with the first client device, an IP address associated with the first client device, a carrier identifier indicative of carrier information associated with the first client device, a user identifier (e.g., at least one of a username associated with the first user account associated with the first client device, an email address, a user account identifier, etc.) associated with the first client device, a browser cookie, etc. In an example where the first plurality of entities corresponds to the first plurality of terms associated with web addresses of internet resources, an entity of the one or more first entities may correspond to a term comprised within an internet resource that the first client device accessed during the first period of time.

Alternatively and/or additionally, the one or more first entities associated with the one or more first sets of event metrics may comprise entities, of the first plurality of entities, with which the first client device (and/or the first set of client devices) performed events, amounting to at least a threshold quantity of events, of the first plurality of events. For example, the first plurality of sets of event information may be analyzed based upon the first client device and the threshold quantity of events to identify the one or more first entities with which the first client device performed events, amounting to at least the threshold quantity events, of the first plurality of events. For example, the first plurality of sets of event information may be analyzed based upon the first identification information associated with the first client device to identify the one or more first entities. In an example where the first plurality of entities corresponds to the first plurality of terms associated with web addresses of internet resources, an entity of the one or more first entities may correspond to a term comprised within one or more web addresses of one or more internet resources accessed by the first client device, wherein a quantity of times that the first client device accessed an internet resource having a web address comprising the term exceeds the threshold quantity of events.

Alternatively and/or additionally, the one or more first entities associated with the one or more first sets of event metrics may comprise entities, of the first plurality of entities, with which the first client device (and/or the first set of client devices) performed events at a rate of at least a threshold rate of events. For example, the first plurality of sets of event information may be analyzed based upon the first client device and the threshold rate of events to identify the one or more first entities with which the first client device performed events at a rate of at least the threshold rate of events.

Alternatively and/or additionally, the one or more first entities associated with the one or more first sets of event metrics may comprise entities, of the first plurality of entities, associated with entity weights (such as the first entity weight associated with the first entity) greater than a threshold entity weight.

Alternatively and/or additionally, in an example where the first plurality of entities corresponds to the first plurality of terms associated with web addresses of internet resources, an entity of the one or more first entities may correspond to a term comprised within at least one web address of at least one internet resource accessed by the first client device (and/or the first set of client devices) during the first period of time.

Alternatively and/or additionally, in an example where the first plurality of entities corresponds to the first plurality of terms associated with web addresses of internet resources, an entity of the one or more first entities may correspond to a term associated with a rate of occurrences (such as the rate of occurrences described with respect to the first term) greater than a threshold rate of occurrences.

Alternatively and/or additionally in an example where the first plurality of entities corresponds to the first plurality of terms associated with web addresses of internet resources, an entity of the one or more first entities may correspond to a term associated with a quantity of occurrences (such as the quantity of occurrences described with respect to the first term) greater than a threshold quantity of occurrences.

Alternatively and/or additionally, in an example where the first plurality of entities corresponds to the first plurality of terms associated with web addresses of internet resources, an entity of the one or more first entities may correspond to a term associated with a term weight (such as the first term weight associated with the first term) greater than a threshold term weight.

In some examples, for each entity of the one or more first entities, a set of event metrics associated with the first client device (and/or the first set of client devices) and the entity may be determined (based upon the first plurality of sets of event information) and included in the first network profile.

Figure 5D:
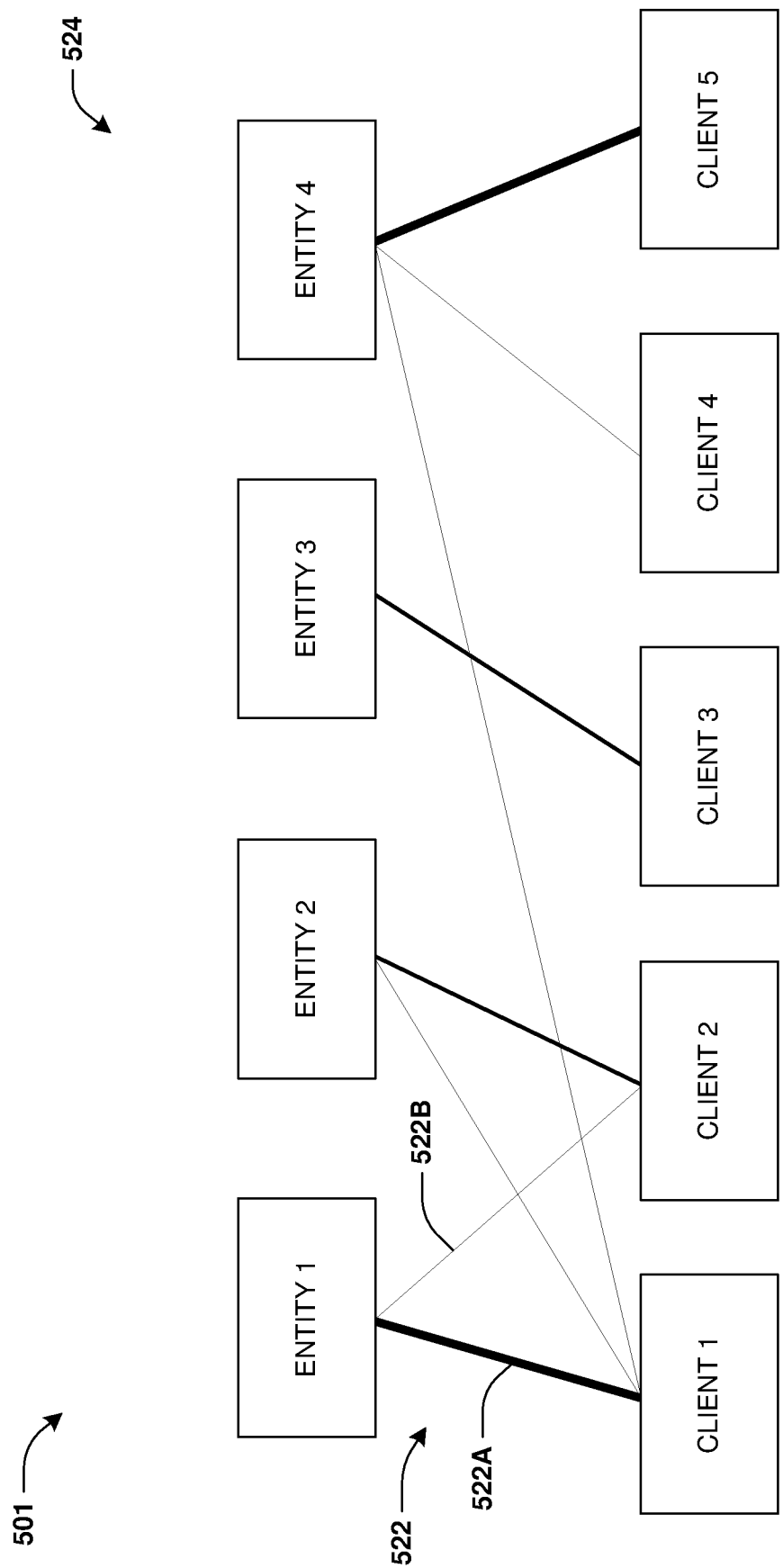
FIG. 5D is a component block diagram illustrating a representation of a first network profile generated by an example system for generating a similarity profile and/or modifying a user profile based upon the similarity profile.

FIG. 5D illustrates a representation 524 of the first network profile. In some examples, the representation 524 may correspond to a graph, such as a bipartite graph. The representation 524 may comprise relationship lines 522. A relationship line of the relationship lines 522 may be between a client device of the first plurality of client devices (e.g., labeled "CLIENT 1", CLIENT 2", etc. in FIG. 5F) and an entity of the first plurality of entities (e.g., labeled "ENTITY 1", ENTITY 2", etc. in FIG. 5F). A relationship line of the relationship lines 522 between a client device of the first plurality of client devices and an entity of the first plurality of entities may be indicative of at least one event, of the first plurality of events, having occurred in association with the client device and the entity. Alternatively and/or additionally, a relationship line of the relationship lines 522 between a client device of the first plurality of client devices and an entity of the first plurality of entities may be indicative of events (of the first plurality of events), amounting to at least the threshold quantity of events, having occurred in association with the client device and the entity.

In some examples, a relationship line of the relationship lines 522 between a client device of the first plurality of client devices and an entity of the first plurality of entities may have a weight (represented by thickness in FIG. 5D, for example) that reflects a quantity of events having occurred in association with the client device and the entity and/or an event rate at which events associated with the client device and the entity occur (and/or, in an example where the entity is a term of the first plurality of terms, a quantity of occurrences of the term in web addresses of internet resources accessed by the client device and/or a rate of occurrences of the term in web addresses of internet resources accessed by the client device). In an example, a first relationship line 522A of the relationship lines 522 may be between an entity "ENTITY 1" and a client device "CLIENT 1". A second relationship line 522B of the relationship lines 522 may be between the entity "ENTITY 1" and a client device "CLIENT 2". A weight of the first relationship line 522A may be greater than a weight of the second relationship line 522B. Accordingly, a quantity of events having occurred in association with the entity "ENTITY 1" and the client device "CLIENT 1" may be greater than a quantity of events having occurred in association with the entity "ENTITY 1" and the client device "CLIENT 2". Alternatively and/or additionally, an event rate at which events associated with the entity "ENTITY 1" and the client device "CLIENT 1" occur may be greater than an event rate at which events associated with the entity "ENTITY 1" and the client device "CLIENT 2" occur. Alternatively and/or additionally, in an example where the entity "ENTITY 1" is a term, a quantity of occurrences of the term in web addresses of internet resources accessed by the client device "CLIENT 1" may be greater than a quantity of occurrences of the term in web addresses of internet resources accessed by the client device "CLIENT 2". Alternatively and/or additionally, a rate of occurrences of the term in web addresses of internet resources accessed by the client device "CLIENT 1" may be greater than a rate of occurrences of the term in web addresses of internet resources accessed by the client device "CLIENT 2".

At 406, a first similarity profile associated with the first client device (and/or associated with other client devices of the first plurality of client devices) may be generated based upon the first network profile. The first similarity profile may be indicative of one or more first client devices, of the first plurality of client devices, associated with at least one entity of the one or more first entities. For example, the first similarity profile may be indicative of each client device of the one or more first client devices having performed at least one event (and/or having performed at least a threshold quantity of events) of the first plurality of events in association with at least one entity of the one or more first entities. Alternatively and/or additionally, the first similarity profile may comprise one or more first similarity scores associated with the first client device and the one or more first client devices. For example, a first similarity score of the one or more first similarity scores corresponds to a similarity of the first client device to a second client device of the one or more first client devices, such as a similarity of activity associated with the first client device to activity associated with the second client device.

In some examples, the first similarity score of the one or more first similarity scores is determined based upon the first network profile. For example, the first network profile may be indicative of one or more second sets of event metrics associated with the second client device and one or more second entities of the first plurality of entities. In some examples, the one or more second sets of event metrics may be determined based upon the first plurality of sets of event information. For example, the first plurality of sets of event information may comprise one or more second sets of event information associated with the second client device and/or the one or more second entities. For example, the one or more second sets of event information may be indicative of one or more second events of the first plurality of events. The one or more second sets of event metrics may be determined based upon the one or more second sets of event information. The first similarity score of the one or more first similarity scores may be determined based upon the one or more first sets of event metrics associated with the first client device and the one or more second sets of event metrics associated with the second client device.

Alternatively and/or additionally, the one or more second sets of event information and/or the one or more second sets of event metrics may be associated with multiple client devices, such as a second set of client devices, comprising the second client device, associated with a second user account (e.g., each client device of the second set of client devices may be logged into the second user account). The one or more second sets of event information may be indicative of events performed by the second set of client devices associated with the second user account. For example, activity performed by the second set of client devices may be analyzed to determine the one or more second sets of event information and/or the one or more second sets of event metrics may be determined based upon the one or more second sets of event information determined based upon the activity of the second set of client devices. In some examples, the first similarity score corresponds to a similarity of the first client device (and/or the first set of client devices associated with the first user account) to the second client device (and/or the second set of client devices associated with the second user account), such as a similarity of activity associated with the first client device (and/or the first set of client devices and/or the first user account) to activity associated with the second client device (and/or the second set of client devices and/or the second user account).

One or more common entities may be common to both the one or more first entities associated with the first client device (and/or the first set of client devices associated with the first user account) and the one or more second entities associated with the second client device (and/or the second set of client devices associated with the second user account). For example, both the one or more first entities and the one or more second entities may comprise the one or more common entities. In an example, the one or more common entities may comprise the first entity and/or a second set of event metrics of the one or more second sets of event metrics may correspond to a measure of activity associated with the second client device and the first entity.

In an example where the first plurality of entities corresponds to the first plurality of terms associated with web addresses of internet resources and/or the first entity corresponds to the first term, the first entity being common to both the one or more first entities associated with the first client device and the one or more second entities associated with the second client device may be indicative of both the first client device and the second client device having accessed and/or presented an internet resource having a web address comprising the first term. Alternatively and/or additionally, the first entity being common to both the one or more first entities associated with the first client device and the one or more second entities associated with the second client device may be indicative of both the first client device and the second client device having presented at least a threshold proportion of an internet resource having a web address comprising the first term.

In an example where the first plurality of entities corresponds to the first plurality of web pages and/or the first entity corresponds to the first web page, the first entity being common to both the one or more first entities associated with the first client device and the one or more second entities associated with the second client device may indicate that both the first client device and the second client device performed activity associated with the first web page. For example, the first client device and/or the second client device at least one of accessed and/or presented the first web page, presented a threshold proportion of the first web page, selected the first web page, etc.

In an example where the first plurality of entities corresponds to the first plurality of content items and/or the first entity corresponds to the content item, the first entity being common to both the one or more first entities associated with the first client device and the one or more second entities associated with the second client device may indicate that both the first client device and the second client device performed activity associated with the content item. For example, the first client device and/or the second client device at least one of accessed and/or presented the content item, presented a threshold proportion of the content item, selected the content item, etc.

In an example where the first plurality of entities corresponds to the first plurality of queries and/or the first entity corresponds to the first query, the first entity being common to both the one or more first entities associated with the first client device and the one or more second entities associated with the second client device may indicate that both the first client device and the second client device performed a search using the first query.

In an example where the first plurality of entities corresponds to the first plurality of emails and/or the first entity corresponds to the first email, the first entity being common to both the one or more first entities associated with the first client device and the one or more second entities associated with the second client device may indicate that both the first client device (and/or the first email account) and the second client device (and/or a third email account associated with the second client device) performed activity associated with the first email. For example, the first client device and/or the second client device at least one of received the first email, transmitted the first email, presented and/or accessed the first email, replied to the first email, marked the first email as important, starred the first email, etc. In an example, the first email may be transmitted to an email address list (such as an email address list associated with an email subscription and/or an organization) and/or both the first email account associated with the first client device and the third email account associated with the second client device may receive emails sent to the email address list (e.g., the email address list may be associated with at least one of an email subscription to which the first email account and the third email account are subscribed, an organization, a brand, a company, a place of work, etc. and/or the email address list may be used for spreading information and/or coordinating events). Alternatively and/or additionally, the first email account and the third email account may both be part of an email conversation comprising one or more emails transmitted and/or received among participants of the email conversation.

In an example where the first plurality of entities corresponds to the first plurality of email accounts and/or the first entity corresponds to the second email account, the first entity being common to both the one or more first entities associated with the first client device and the one or more second entities associated with the second client device may indicate that both the first client device (and/or the first email account) and the second client device (and/or the third email account) performed activity associated with the second email account. For example, the first client device and/or the second client device at least one of received an email from the second email account, transmitted an email to the second email account, presented and/or accessed an email from the second email account, marked an email from the second email account as important, starred an email from the second email account, etc. In an example, the second email account may be associated with an email subscription to which the first email account and the third email account are subscribed. Alternatively and/or additionally, the second email account may be associated with at least one of a company, a brand, an organization, etc. (e.g., the second email account may be a customer service email account used for providing information associated with one or more purchases, one or more inquiries, etc. to the first email account and/or the third email account). Alternatively and/or additionally, the first email account, the second email account and/or the third email account may be part of one or more email conversations comprising one or more emails transmitted and/or received among participants of the one or more email conversations.

In an example where the first plurality of entities corresponds to the first plurality of social media posts and/or the first entity corresponds to the first social media post, the first entity being common to both the one or more first entities associated with the first client device and the one or more second entities associated with the second client device may indicate that both the first client device (and/or the first social media account) and the second client device (and/or a third social media account associated with the second client device) performed activity associated with the first social media post. For example, the first client device and/or the second client device at least one of presented and/or accessed the first social media post, shared the first social media post, exhibited a reaction to the first social media post, posted a comment to the first social media post, etc. In an example, the first social media post may be shared among a plurality of social media accounts (such as friends on a social media platform). The first social media account and the third social media account may be a part of the plurality of social media accounts with which the first social media post is shared.

In an example where the first plurality of entities corresponds to the first plurality of social media accounts and/or the first entity corresponds to the first social media post, the first entity being common to both the one or more first entities associated with the first client device and the one or more second entities associated with the second client device may indicate that both the first client device (and/or the first social media account) and the second client device (and/or the third social media account) performed activity associated with the first social media account. For example, the first client device and/or the second client device at least one of presented and/or accessed a social media post shared by the second social media account, shared a social media post posted by the second social media account, exhibited a reaction to a social media post posted by the second social media account, posted a comment to a social media post posted by the second social media account, etc. In an example, the second social media account may be linked to the first social media account and/or the third social media account. For example, the second social media account may be friends with the first social media account and/or the third social media account. Alternatively and/or additionally, the first social media account and/or the third social media account may follow the second social media account. For example, the first social media account and the third social media account may be a part of a plurality of social media accounts with which the second social media account shares social media posts.

In some examples, the first similarity score may be based upon a quantity of common entities (e.g., a quantity of entities of the one or more common entities) that are common to both the one or more first entities (associated with the first client device and/or the first set of client devices) and the one or more second entities (associated with the second client device and/or the second set of client devices). For example, a higher quantity of the quantity of common entities may correspond to a higher score of the first similarity score.

Alternatively and/or additionally, the first similarity score may be based upon a difference between metrics of the one or more first sets of event metrics and metrics of the one or more second sets of event metrics corresponding to the one or more common entities. For example, the one or more first sets of event metrics may comprise one or more first common sets of event metrics associated with the first client device and the one or more common entities. The one or more second sets of event metrics may comprise one or more second common sets of event metrics associated with the second client device and the one or more common entities. The first similarity score may be based upon one or more differences between metrics of the one or more first common sets of event metrics associated with the first client device and metrics of the one or more second common sets of event metrics associated with the second client device.

One or more entity similarity scores associated with the one or more common entities may be determined. In an example where the first entity is common to both the one or more first entities (associated with the first client device and/or the first set of client devices) and the one or more second entities (associated with the second client device and/or the second set of client devices), a first entity similarity score, associated with the first entity, of the one or more entity similarity scores may be determined based upon the first set of event metrics (associated with the first client device and the first entity) and/or the second set of metrics (associated with the second client device and the first entity). In some examples, the first similarity score may be determined based upon a difference between one or more metrics of the first set of event metrics and one or more metrics of the second set of event metrics. For example, a higher difference between the one or more metrics of the first set of event metrics and the one or more metrics of the second set of event metrics may correspond to a lower similarity score of the first entity similarity score. The first similarity score (corresponding to the similarity of the first client device to the second client device) may be determined based upon the one or more entity similarity scores (comprising the first similarity score.

In some examples, the first entity similarity score may be determined based upon the first event rate of the first set of event metrics and/or a second event rate, indicated by the second set of event metrics, corresponding to a rate at which events associated with the second client device (and/or the second set of client devices) and the first entity occur, such as during the first period of time. For example, one or more operations (e.g., mathematical operations) may be performed using the first event rate and/or the second event rate to determine the first entity similarity score. In an example, the first entity similarity score may be determined based upon a difference between the first event rate and the second event rate. For example, a higher difference between the first event rate and the second event rate may correspond to a lower similarity score of the first entity similarity score.

Alternatively and/or additionally, the first entity similarity score may be determined based upon the first quantity of events of the first set of event metrics and a second quantity of events, indicated by the second set of event metrics, corresponding to a quantity of events associated with the second client device (and/or the second set of client devices) and the first entity, such as during the first period of time. For example, one or more operations (e.g., mathematical operations) may be performed using the first quantity of events and/or the second quantity of events to determine the first entity similarity score. In an example, the first entity similarity score may be determined based upon a difference between the first quantity of events and the second quantity of events. For example, a higher difference between the first quantity of events and the second quantity of events may correspond to a lower similarity score of the first entity similarity score.

Alternatively and/or additionally, the first entity similarity score may be determined based upon the first entity weight of the first set of event metrics and a second entity weight, indicated by the second set of event metrics, associated with the first entity and the second client device and/or the second set of client devices (e.g., the second entity weight may be determined based upon at least one of the second rate of events, a second rate of total events associated with the second client device and/or the second set of client devices, the second quantity of events, a second quantity of total events associated with the second client device and/or the second set of client devices, etc., such as using one or more techniques described herein with respect to determining the first entity weight). For example, one or more operations (e.g., mathematical operations) may be performed using the first entity weight and/or the second entity weight to determine the first entity similarity score. In an example, the first entity similarity score may be determined based upon a difference between the first entity weight and the second entity weight. For example, a higher difference between the first entity weight and the second entity weight may correspond to a lower similarity score of the first entity similarity score.

Alternatively and/or additionally, in a scenario in which the first entity corresponds to the first term, the first entity similarity score may be determined based upon the first rate of occurrences of the first term indicated by the first set of event metrics and/or a second rate of occurrences of the first term, indicated by the second set of event metrics, corresponding to a rate of occurrences of the first term in web addresses of internet resources accessed by the second client device (and/or the second set of client devices) per unit of time. For example, one or more operations (e.g., mathematical operations) may be performed using the first rate of occurrences of the first term and/or the second rate of occurrences of the first term to determine the first entity similarity score. In an example, the first entity similarity score may be determined based upon a difference between the first rate of occurrences of the first term and the second rate of occurrences of the first term. For example, a higher difference between the first rate of occurrences of the first term and the second rate of occurrences of the first term may correspond to a lower similarity score of the first entity similarity score.

Alternatively and/or additionally, in a scenario in which the first entity corresponds to the first term, the first entity similarity score may be determined based upon the first quantity of occurrences of the first term indicated by the first set of event metrics and/or a second quantity of occurrences of the first term, indicated by the second set of event metrics, corresponding to a quantity of occurrences of the first term in web addresses of internet resources accessed by the second client device (and/or the second set of client devices) during the first period of time. For example, one or more operations (e.g., mathematical operations) may be performed using the first quantity of occurrences of the first term and/or the second quantity of occurrences of the first term to determine the first entity similarity score. In an example, the first entity similarity score may be determined based upon a difference between the first quantity of occurrences of the first term and the second quantity of occurrences of the first term. For example, a higher difference between the first quantity of occurrences of the first term and the second quantity of occurrences of the first term may correspond to a lower similarity score of the first entity similarity score.

Alternatively and/or additionally, in a scenario in which the first entity corresponds to the first term, the first entity similarity score may be determined based upon the first term weight of the first set of event metrics and a second term weight, indicated by the second set of event metrics, associated with the first entity and the second client device and/or the second set of client devices (e.g., the second term weight may be determined based upon at least one of the second rate of occurrences of the first term, a second rate of total occurrences of terms associated with the second client device and/or the second set of client devices, the second quantity of occurrences of the first term, a second quantity of total occurrences of terms associated with the second client device and/or the second set of client devices, etc., such as using one or more techniques described herein with respect to determining the first term weight). For example, one or more operations (e.g., mathematical operations) may be performed using the first term weight and/or the second term weight to determine the first entity similarity score. In an example, the first entity similarity score may be determined based upon a difference between the first term weight and the second term weight. For example, a higher difference between the first term weight and the second term weight may correspond to a lower similarity score of the first entity similarity score.

In some examples, the first entity similarity score may be determined based upon a first value associated with the first set of event metrics (associated with the first client device and the first entity) and a second value associated with the second set of event metrics (associated with the second client device and the first entity).

In some examples, the first value may be determined based upon at least one of the first event rate, the first quantity of events, the first entity weight, the first rate of occurrences of the first term, the first quantity of occurrences of the first term, the first term weight, etc. For example, the first value may be equal to (and/or be determined based upon) one of the first event rate, the first quantity of events, the first entity weight, the first rate of occurrences of the first term, the first quantity of occurrences of the first term, the first term weight, etc. Alternatively and/or additionally, the first value may be a combination of two or more of the first event rate, the first quantity of events, the first entity weight, the first rate of occurrences of the first term of the first term, the first quantity of occurrences of the first term of the first term, the first term weight, etc.

In some examples, the second value may be determined based upon at least one of the second event rate, the second quantity of events, the second entity weight, the second rate of occurrences of the first term, the second quantity of occurrences of the first term, the second term weight, etc. For example, the second value may be equal to (and/or be determined based upon) one of the second event rate, the second quantity of events, the second entity weight, the second rate of occurrences of the first term, the second quantity of occurrences of the first term, the second term weight, etc. Alternatively and/or additionally, the second value may be a combination of two or more of the second event rate, the second quantity of events, the second entity weight, the second rate of occurrences of the first term, the second quantity of occurrences of the first term, the second term weight, etc.

One or more operations (e.g., mathematical operations) may be performed using the first value and/or the second value to determine the first entity similarity score. In an example, the first entity similarity score may be equal to $$v_1 \times \frac{\min(v_1, v_2)}{\max(v_1, v_2)},$$

where $v_1$ corresponds to the first value and/or $v_2$ corresponds to the second value. Alternatively and/or additionally, the first entity similarity score may be equal to $$w_1 \times \frac{\min(w_1, w_2)}{\max(w_1, w_2)},$$

where $w_1$ may correspond to the first entity weight and/or $w_2$ may correspond to the second entity weight. Alternatively and/or additionally, in an example where the first entity corresponds to the first term, $w_1$ may correspond to the first term weight and/or $w_2$ may correspond to the second term weight.

Alternatively and/or additionally, the first entity similarity score may be determined based upon a first entity frequency value associated with the first entity. The first entity frequency value may correspond to a rate at which events associated with the first entity (e.g., the events may comprise some and/or all events, of the first plurality of events, that are performed by client devices of the first plurality of client devices in association with the first entity) are performed by client devices of the first plurality of client devices per unit of time (such as per day or other unit of time). Alternatively and/or additionally, the first entity frequency value may correspond to a quantity of total events associated with the first entity (e.g., the total events may comprise some and/or all events, of the first plurality of events, that are performed by client devices of the first plurality of client devices in association with the first entity, such as during the first period of time). Alternatively and/or additionally, in an example where the first entity corresponds to the first term, the first entity frequency value may correspond to a rate of occurrences of the first term in web addresses of internet resources accessed by client devices of the first plurality of client devices per unit of time, such as per day. Alternatively and/or additionally, in an example where the first entity corresponds to the first term, the first entity frequency value may correspond to a quantity of occurrences of the first term in web addresses of internet resources accessed by client devices of the first plurality of client devices during the first period of time. In some examples, the first entity frequency value associated with the first entity may be related to a prevalence of activity associated with the first entity in activity of the first plurality of client devices. The first entity frequency value may be used in determining the first entity similarity score (and/or the first similarity score) such that the prevalence of the activity associated with the first entity is taken into account. In some examples, a higher value of the first entity frequency value (and/or a higher prevalence of the activity associated with the first entity) may correspond to a lower score of the first entity similarity score (and/or a lower score of the first similarity score). It may be appreciated that by determining the first entity similarity score (and/or the first similarity score) based upon the first entity frequency value leads to a more accurate determination of a similarity of the first client device to the second client device. In some examples, one or more operations may be performed using the first value, the second value and/or the first entity frequency value to determine the first entity similarity score. In an example, the first entity similarity score may be equal to $$\frac{v_1}{\log_e(freq)} \times \frac{\min(v_1, v_2)}{\max(v_1, v_2)},$$

where $v_1$ corresponds to the first value, $v_2$ corresponds to the second value, and/or freq corresponds to the first entity frequency value. Alternatively and/or additionally, the first entity similarity score may be equal to $$\frac{w_1}{\log_e(freq)} \times \frac{\min(w_1, w_2)}{\max(w_1, w_2)},$$

where $w_1$ may correspond to the first entity weight (and/or the first term weight), $w_2$ may correspond to the second entity weight (and/or the second term weight) and/or freq may correspond to the first entity frequency value. Alternatively and/or additionally, the first entity similarity score may be equal to $$\frac{(v_1)^2 \times v_2}{\log_e(freq)},$$

where $v_1$ corresponds to the first value, $v_2$ corresponds to the second value, and/or freq corresponds to the first entity frequency value. Alternatively and/or additionally, the first entity similarity score may be equal to $$\frac{(w_1)^2 \times w_2}{\log_e(freq)},$$

where $w_1$ may correspond to the first entity weight (and/or the first term weight), $w_2$ may correspond to the second entity weight (and/or the second term weight) and/or freq may correspond to the first entity frequency value.

In some examples, the one or more entity similarity scores associated with the one or more common entities may comprise the first entity similarity score (associated with the first entity) and/or one or more other entity similarity scores (associated with one or more other entities of the one or more common entities other than the first entity). The one or more other entity similarity scores may be determined using one or more of the techniques described herein with respect to determining the first entity similarity score. The first similarity score may be determined based upon the one or more entity similarity scores associated with the one or more common entities. For example, one or more operations (e.g., mathematical operations) may be performed using the one or more entity similarity scores to determine the first similarity score. In an example, the first similarity score may correspond to a sum (and/or a different type of combination) of the one or more entity similarity scores.

In some examples, the one or more first similarity scores (associated with the first client device and the one or more first client devices) may comprise the first similarity score (associated with the second client device) and/or one or more other similarity scores (associated with one or more other client devices of the one or more first client devices other than the second client device). The one or more other similarity scores may be determined using one or more of the techniques described herein with respect to determining the first entity similarity score.

Figure 5E:
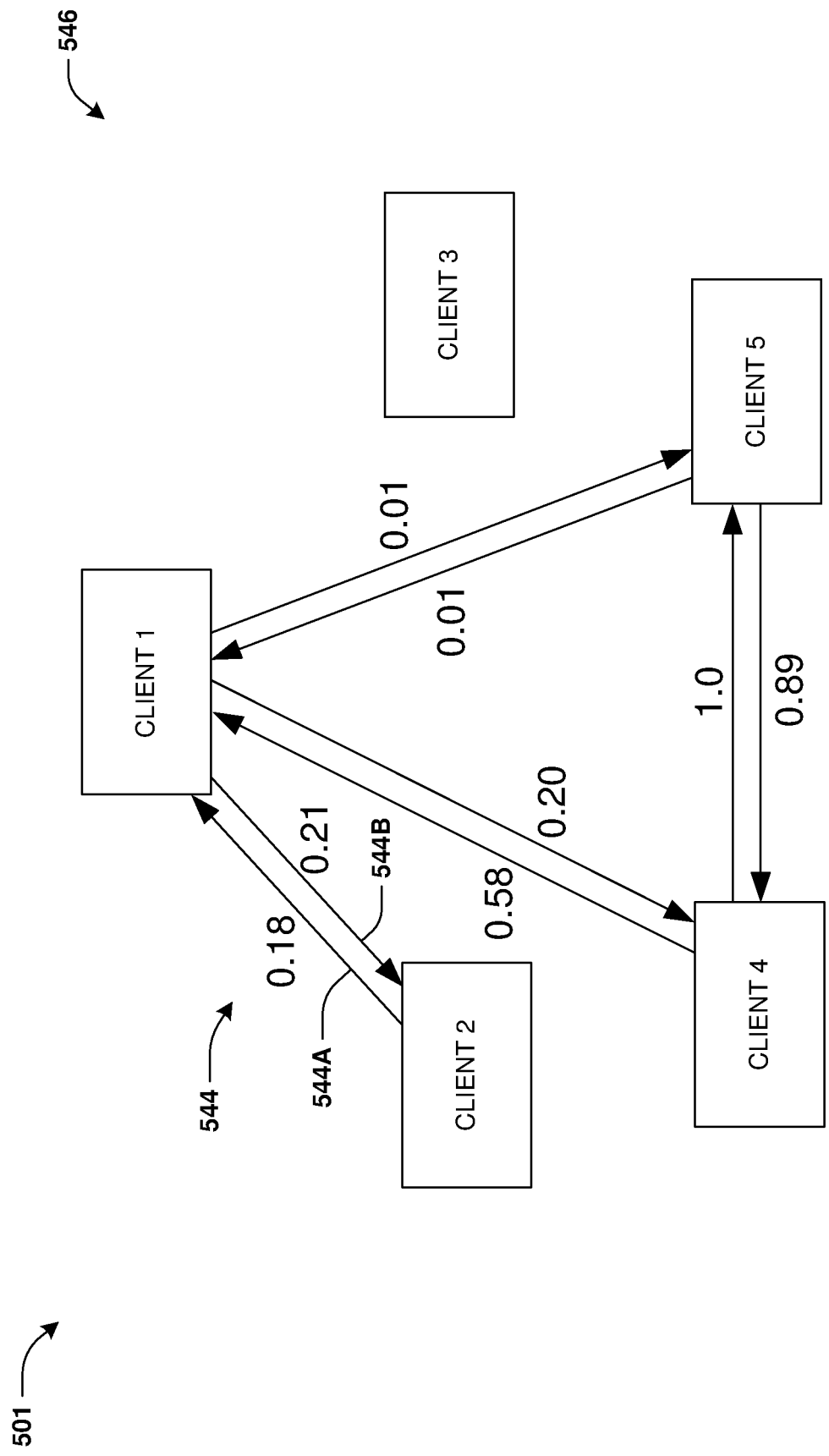
FIG. 5E is a component block diagram illustrating a representation of a first similarity profile generated by an example system for generating a similarity profile and/or modifying a user profile based upon the similarity profile.

FIG. 5E illustrates a representation 546 of the first similarity profile. In some examples, the representation 546 may be generated based upon the first network profile and/or the representation 524 of the first network profile. For example, the representation 546 may correspond to a one-mode projection of the first network profile and/or the representation 524 of the first network profile (e.g., the bipartite graph). The representation 546 may comprise similarity lines 544. A similarity line of the similarity lines 544 may be between two client devices of the first plurality of client devices. A similarity line of the similarity lines 544 between two client devices may be indicative of both of the two client devices having performed one or more events of the first plurality of events in association with at least one common entity.

In some examples, the representation 546 of the first similarity profile may be indicative of similarity scores associated with client devices, such as determined using one or more of the techniques described herein. The similarity scores of the representation 546 (and/or the similarity profile) may be asymmetrical, where a similarity score corresponding to a similarity of a first exemplary client device to a second exemplary client device is different than a similarity score corresponding to a similarity of the second exemplary client device to the first exemplary client device. For example, a similarity score of 0.18 associated with a first similarity line 544A corresponds to a similarity of the client device "CLIENT 2" to the client device "CLIENT 1". Alternatively and/or additionally, a similarity score of 0.21 associated with a second similarity line 544B corresponds to a similarity of the client device "CLIENT 1" to the client device "CLIENT 2" (different than the similarity of the client device "CLIENT 2" to the client device "CLIENT 1").

In some examples, the content system may generate and/or maintain a user profile database comprising a plurality of user profiles associated with a plurality of client devices and/or a plurality of user accounts (e.g., email accounts, messaging accounts, content platform accounts for uploading content and/or for consuming articles, videos and/or audio, etc.) associated with the content system. A user profile of the plurality of user profiles may comprise an identifier that identifies the user profile, a client device associated with the user profile and/or a user account associated with the user profile. Alternatively and/or additionally, a user profile of the plurality of user profiles may comprise demographic information, such as an age (and/or age range), family size, gender, occupation, income, and/or other demographic information. Alternatively and/or additionally, a user profile of the plurality of user profiles may comprise activity information associated with a client device and/or a user account. For example, the activity information may be indicative of at least one of one or more consumed content items (e.g., a consumed content item may correspond to at least one of an article, a video, an audio file, an image, a web page, an advertisement, an email, a message, etc. consumed by a user), one or more accessed content items, one or more selected content items, one or more content item interactions (e.g., an advertisement impression, an advertisement click, etc.), etc.

In some examples, the plurality of user profiles of the user profile database comprises a first user profile associated with the first client device and/or the first user account. For example, the first user profile may comprise identification information associated with the first client device and/or the first user account, such as at least some of the first identification information. Alternatively and/or additionally, the first user profile may comprise first demographic information associated with a first user of the first client device, such as an age (and/or age range), family size, gender, occupation, income, and/or other demographic information. Alternatively and/or additionally, the first user profile may comprise activity information associated with the first client device and/or the first user account. For example, the activity information may be indicative of at least one of one or more consumed internet resources (e.g., a consumed internet resource may correspond to at least one of an article, a video, an audio file, an image, a web page, an advertisement, an email, a message, etc. consumed via the first client device), one or more accessed internet resources (e.g., one or more internet resources accessed by the first client device and/or the first user account), one or more selected internet resources, one or more content interactions (e.g., an advertisement impression, an advertisement click, etc.), etc.

At 408, the first user profile associated with the first client device may be modified to generate a modified first user profile based upon the first similarity profile and/or one or more first user profiles associated with the one or more first client devices.

In some examples, the first user profile is modified based upon the one or more first user profiles based upon a determination that each similarity score of the one or more first similarity scores exceed a threshold similarity score. For example, generation of the modified first user profile may not be performed based upon a user profile associated with a client device with which the first client device has a similarity score that does not meet the threshold similarity score.

In some examples, the one or more first user profiles based upon which the first user profile is modified are limited to a threshold quantity of user profiles. In an example, the first similarity profile may be indicative of client devices related to the first client device (e.g., client devices of the first plurality of client devices that are associated with one or more entities of the one or more first entities associated with the first client device). In the example, a quantity of the client devices may exceed a threshold quantity of client devices corresponding to the threshold quantity of user profiles. The first similarity profile may be indicative of similarity scores associated with the first client device and the client devices. The first user profile may be modified based upon user profiles associated with a subset of the client devices based upon a determination that the quantity of the client devices exceeds the threshold quantity of client devices. The user profiles based upon which the first user profile is modified may not exceed the threshold quantity of user profiles. The subset of the client devices and/or the user profiles associated with the subset of the client devices may be selected (for use in modifying the first user profile) based upon a determination that similarity scores associated with the subset of the client devices (and the first client device) are the highest similarity scores among the similarity scores associated with the client devices from which the subset is selected. In an example, the threshold quantity of user profiles is 100 user profiles (and/or the threshold quantity of client devices is 100 client devices). In the example where the threshold quantity of user profiles is 100 user profiles (and/or the threshold quantity of client devices is 100 client devices), the subset of the client devices and/or the user profiles associated with the subset of the client devices may be selected (for use in modifying the first user profile) based upon a determination that similarity scores associated with the subset are the top 100 similarity scores amongst the similarity scores associated with the client devices from which the subset is selected. It may be appreciated that applying the threshold quantity of user profiles (and/or the threshold quantity of client devices) for modifying the first user profile associated with the first client devices provides for an increased efficiency in modifying the first user profile to generate the modified first user profile (e.g., the first user profile may be modified with improved computational efficiency, increased speed and/or reduced memory usage as compared to systems that do not apply the threshold quantity of user profiles and/or the threshold quantity of client devices for modifying the first user profile).

In some examples, one or more first sets of feature information may be determined based upon the one or more first user profiles. In some examples, the one or more first user profiles comprise a second user profile associated with the second client device (and/or associated with the second user account). In some examples, a first set of feature information of the one or more first sets of feature information may be determined based upon the second user profile. For example, the second user profile may be analyzed to identify the first set of feature information, comprised within the second user profile, indicative of one or more first features associated with the second client device (and/or the second user account). For example, a feature of the one or more first features may correspond to at least one of a consumed internet resource (e.g., a consumed internet resource may correspond to at least one of an article, a video, an audio file, an image, a web page, an advertisement, an email, a message, etc. consumed via the second client device), an accessed internet resource (e.g., an internet resource accessed by the second client device), a selected internet resource, a content interaction (e.g., an advertisement impression, an advertisement click, etc.), a purchase of a product and/or a service, a conversion event (e.g., a purchase of a product and/or a service, performed via the second client device, associated with an advertisement and/or other type of content accessed and/or displayed via the second client device), a query used to perform a search (such as using a search engine), etc. In some examples, the first set of feature information of the second user profile may comprise one or more first feature vectors corresponding to the one or more first features. A feature vector of the one or more first feature vectors may be a representation (e.g., a vector representation) of a feature of the one or more first features.

In some examples, the one or more first sets of feature information (determined based upon the one or more first user profiles) may comprise the first set of feature information (associated with the second client device) and/or one or more other sets of feature information (associated with one or more other client devices of the one or more first client devices). The one or more other sets of feature information may be determined using one or more of the techniques described herein with respect to determining the first set of feature information.

In some examples, a first set of supplemental feature information may be generated based upon the one or more first sets of feature information and/or the one or more first similarity scores. The first set of supplemental feature information may be indicative of one or more first supplemental features and/or one or more first weights associated with the one or more first supplemental features. The one or more first supplemental features may comprise one, some and/or all features indicated by the one or more first sets of feature information. In some examples, a weight of the one or more first weights may be determined based upon a similarity score of the one or more first similarity scores. A first weight of the one or more first weights may be associated with a first supplemental feature of the one or more first supplemental features. The first supplemental feature may be determined based upon (e.g., identified in) one or more sets of feature information of the one or more first sets of feature information. For example, the first supplemental feature may be comprised within one or more sets of feature information of the one or more first sets of feature information.

In an example, the first supplemental feature may be identified in a single set of feature information of the one or more first sets of feature information associated with the one or more first user profiles (e.g., the first supplemental feature may be indicated by merely a single user profile of the one or more first user profiles). In the example, the first weight associated with the first supplemental feature may be determined based upon a similarity score, of the one or more first similarity scores, associated with the single user profile (e.g., the similarity score may be associated with a client device, of the one or more first client devices, associated with the single user profile). In an example where the single set of feature information corresponds to the first set of feature information associated with the second client device (e.g., the single user profile corresponds to the second user profile associated with the second client device), the first weight may be determined based upon the first similarity score (corresponding to a similarity of the first client device to the second client device). For example, the first weight may be equal to the first similarity score. Alternatively and/or additionally, the first weight may be determined by performing one or more operations (e.g., mathematical operations) using the first similarity score.

In an example, a second supplement feature of the one or more first supplemental features may be identified in multiple sets of feature information of the one or more first sets of feature information associated with the one or more first user profiles (e.g., the second supplemental feature may be indicated by multiple user profiles of the one or more first user profiles). In the example, a second weight, of the one or more first weights, associated with the second supplemental feature may be determined based upon multiple similarity scores, of the one or more first similarity scores, associated with the multiple user profiles (e.g., the multiple similarity scores may be associated with multiple client devices, of the one or more first client devices, associated with the multiple user profiles). In an example where the multiple sets of feature information comprise the first set of feature information associated with the second client device and/or a second set of feature information associated with a third client device (e.g., the multiple user profiles comprises the second user profile associated with the second client device and/or a third user profile associated with the third client device), the second weight may be determined based upon the first similarity score (corresponding to a similarity of the first client device to the second client device) and/or a second similarity score of the one or more first similarity scores. For example, the second similarity score may correspond to a similarity of the first client device to the third client device. In some examples, the second weight may be determined by performing one or more operations (e.g., mathematical operations) using the first similarity score and the second similarity score. In an example, the first similarity score and the second similarity score may be combined (e.g., summed) to determine the second weight. In an example where the first similarity score corresponds to 0.08 and/or the second similarity score corresponds to 0.03, the first similarity score and the second similarity score may be combined (e.g., summed) to determine that the second weight is 0.11 (and/or a different value).

In some examples, the one or more first weights (associated with the one or more first supplemental features) may comprise the first weight (associated with the first supplemental feature), the second weight (associated with the second supplemental feature) and/or one or more other weights (associated with one or more other supplemental features, of the one or more first supplemental features, other than the first supplemental feature and the second supplemental feature). The one or more other weights may be determined using one or more of the techniques described herein with respect to determining the first weight and/or the second weight.

In some examples, the first set of supplemental information may comprise one or more first supplemental feature vectors associated with the one or more first supplemental features and/or the one or more first weights. In some examples, a supplemental feature vector of the one or more first supplemental feature vectors may be a representation (e.g., a vector representation) of a feature of the one or more first supplemental features and/or a weight, of the one or more first weights, associated with the feature. For example, a first supplemental feature vector may be generated based upon a first feature vector associated with the first supplemental feature (e.g., the first feature vector may be identified in a user profile of the one or more first user profiles) and/or the first weight. One or more operations (e.g., mathematical operations) may be performed using the first feature vector and/or the first weight to generate the first supplemental feature vector.

In some examples, the one or more first supplemental feature vectors (associated with the one or more first supplemental features and/or the one or more first weights) may comprise the first supplemental feature vector (associated with the first supplemental feature and/or the first weight) and/or one or more other supplemental feature vectors (associated with one or more other supplemental features, of the one or more first supplemental features, other than the first supplemental feature). The one or more other supplemental feature vectors may be determined using one or more of the techniques described herein with respect to determining the first supplemental feature vector.

In some examples, the first supplemental feature information and/or the one or more first supplemental features may correspond to one or more first types of features. For example, the one or more first types of features may comprise at least one of a type of feature corresponding to consumed internet resources of one or more first types (e.g., a type of the one or more first types may correspond to at least one of articles, videos, audio files, images, web pages, advertisements, emails, messages, browser-accessible internet resources, internet resources accessible via one or more mobile applications, etc.), a type of feature corresponding to accessed internet resources of one or more second types, a type of feature corresponding to selected internet resources of one or more third types, a type of feature corresponding to content interactions, a type of feature corresponding to conversion events, etc. In an example, the one or more first types of features may comprise a first type of feature corresponding to purchases of products and/or services, a second type of feature corresponding to advertisement clicks and/or a third type of feature corresponding to accessed videos accessible via a first mobile application. Accordingly, in the example, the first supplemental feature information and/or the one or more first supplemental features may be associated with at least one of one or more purchased products, one or more purchased services, one or more advertisements clicked on (and/or otherwise selected), one or more videos accessed via the first mobile application, etc. In some examples, the one or more first types of features may be configured prior to generating the first supplemental feature information. For example, the one or more first user profiles may be analyzed based upon the one or more first types of features such that features, of the one or more first sets of feature information identified in the one or more first user profiles, each correspond to one, some and/or all of the one or more first types of features. Alternatively and/or additionally, some features of the one or more first sets of feature information may not be associated with the one or more first types of features. The first supplemental feature information may be generated based upon the one or more first types of features such that the one or more first supplemental features and/or the first supplemental feature information are associated with the one or more first types of features and/or such that feature information (and/or one or more features) of the one or more first sets of feature information that is not associated with the one or more first types of features is not included in the first supplemental feature information.

In some examples, the first supplemental feature information may be included in (e.g., added to) the first user profile to generate the modified first user profile. In some examples, the first supplemental feature information included in the first user profile may comprise less than a threshold quantity of supplemental features. For example, the one or more first supplemental features may be limited by the threshold quantity of supplemental features. In an example where supplemental features amounting to greater than the threshold quantity of supplemental features are determined, the one or more first supplemental features, amounting to less than the threshold quantity of supplemental features, may be selected from the supplemental features for inclusion in the first user profile. For example, the one or more first supplemental features may be selected from the supplemental features based upon weights associated with the supplemental features (e.g., the one or more first supplemental features may be selected based upon a determination that the one or more first weights associated with the one or more first supplemental features are highest weights of the weights associated with the supplemental features).

In some examples, such as in an example in which the user profile database does not comprise the first user profile associated with the first client device and/or the first user account, a user profile associated with the first client device and/or the first user account may be generated based upon the first similarity profile and/or the one or more first user profiles. For example, the user profile may comprise the first supplemental feature information. Alternatively and/or additionally, in an example where the user profile database comprises the first user profile, a fourth user profile associated with the first client device and/or the first user account may be generated based upon the first user profile, the first similarity profile and/or the one or more first user profiles. For example, the fourth user profile may comprise information of the first user profile and/or the first supplemental feature information.

Figure 5F:
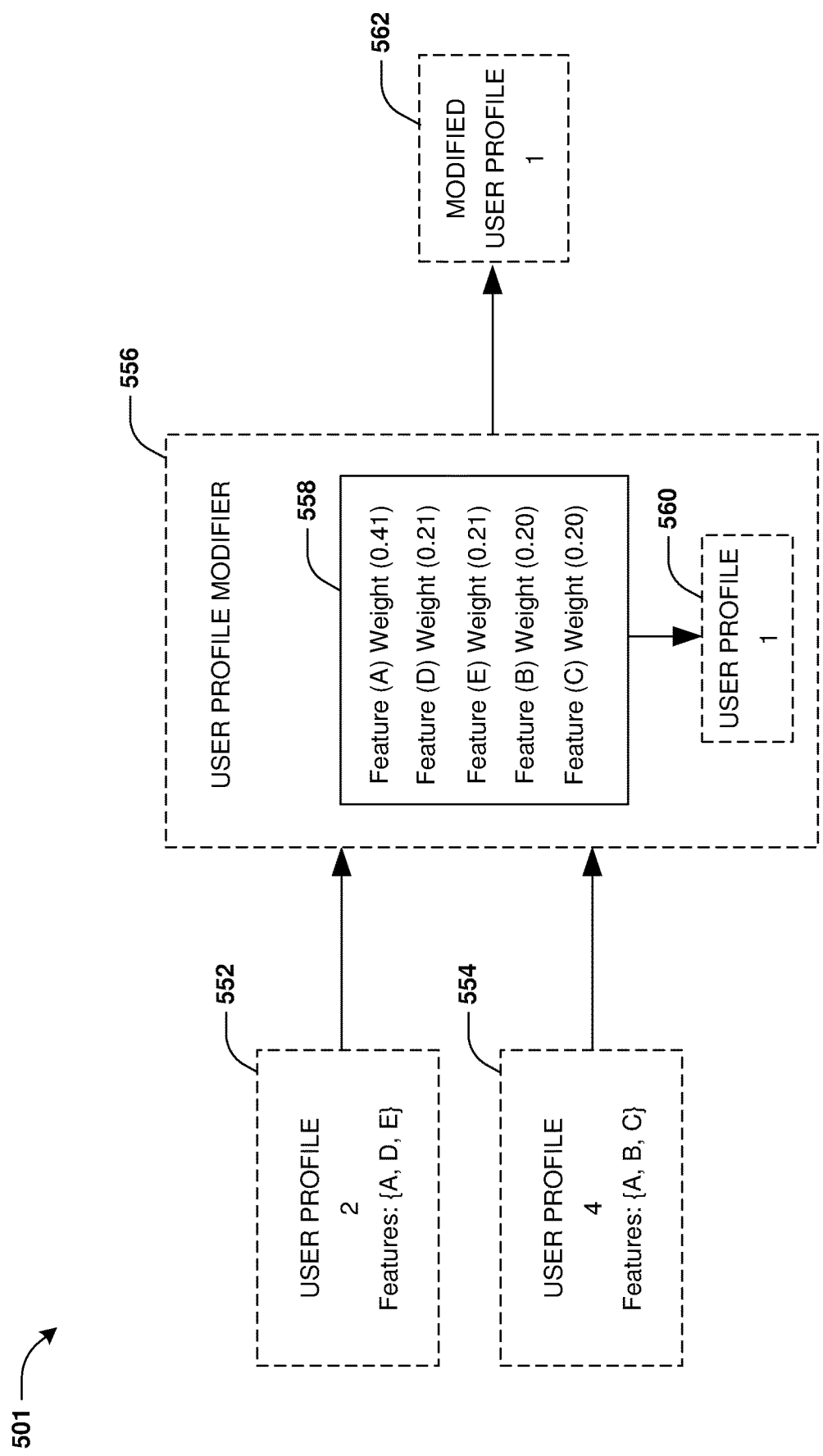
FIG. 5F is a component block diagram illustrating an example system for generating a similarity profile and/or modifying a user profile based upon the similarity profile, where a user profile is modified based upon a first similarity profile.

FIG. 5F illustrates modification of a user profile 560 "USER PROFILE 1", associated with the client device "CLIENT 1", based upon the first similarity profile. In some examples, the first similarity profile is analyzed to determine that the client device "CLIENT 1" is related to the client device "CLIENT 2", a client device "CLIENT 4", and/or a client device "CLIENT 5". A user profile "USER PROFILE 2" 552 associated with the client device "CLIENT 2" may be selected for use in modifying the client device "CLIENT 1" based upon a determination that a similarity score of 0.21, corresponding to a similarity of the client device "CLIENT 1" to the client device "CLIENT 2", exceeds a threshold similarity score. A user profile "USER PROFILE 4" 554 associated with the client device "CLIENT 4" may be selected for use in modifying the user profile 560 "USER PROFILE 1" based upon a determination that a similarity score of 0.20, corresponding to a similarity of the client device "CLIENT 1" to the client device "CLIENT 4", exceeds the threshold similarity score. A user profile associated with the client device "CLIENT 5" may not be selected for use in modifying the user profile 560 "USER PROFILE 1" based upon a determination that a similarity score of 0.01, corresponding to a similarity of the client device "CLIENT 1" to the client device "CLIENT 5", does not meet the threshold similarity score.

In some examples, the user profile "USER PROFILE 2" 552 associated with the client device "CLIENT 2" and/or the user profile "USER PROFILE 4" 554 associated with the client device "CLIENT 4" (and/or one or more other user profiles selected for use in modifying the user profile 560 "USER PROFILE 1") are input to a user profile modifier 556. In some examples, the user profile modifier 556 generates a set of supplemental feature information 558 based upon the user profile "USER PROFILE 2" 552 and/or the user profile "USER PROFILE 4" 554. In some examples, the set of supplemental feature information 558 is indicative of features from the user profile "USER PROFILE 2" 552 and/or the user profile "USER PROFILE 4" 554 and/or weights associated with the features. In an example, the first set of supplemental feature information 558 is indicative of a feature (A) and a weight associated with the feature (A). The weight may be determined based upon one or more similarity scores associated with one or more user profiles that comprise the feature (A). For example, the feature (A) is included in the user profile "USER PROFILE 2" 552 and/or the user profile "USER PROFILE 4" 554, and/or the weight associated with the feature (A) is determined based upon the similarity score of 0.21 (corresponding to a similarity of the client device "CLIENT 1" to the client device "CLIENT 2") and/or the similarity score of 0.20 (corresponding to a similarity of the client device "CLIENT 1" to the client device "CLIENT 4"). In an example, the similarity score of 0.21 and the similarity score of 0.20 may be combined (e.g., summed, multiplied, etc.) to determine the weight associated with the feature (A) (e.g., the weight associated with the feature (A) may be determined to be 0.21+0.20=0.41).

In some examples, features of the set of supplemental feature information 558 and/or weights associated with the features are included in the user profile 560 "USER PROFILE 1" to generate a modified user profile "MODIFIED USER PROFILE 1" 562. In an example, the features of the set of supplemental feature information 558 may be ranked based upon the weights associated with the features. A top X ranked features (such as features associated with the top X weights) may be included in the user profile 560 "USER PROFILE 1" to generate the modified user profile "MODIFIED USER PROFILE 1" 562, where X corresponds to a threshold quantity of features to be included in the user profile 560 "USER PROFILE 1" to generate the modified user profile "MODIFIED USER PROFILE 1" 562.

At 410, content may be selected for presentation via the first client device based upon the modified first user profile (and/or the fourth user profile). For example, the first supplemental feature information (and/or other information of the modified first user profile) may be used in selecting the content for presentation via the first client device.

In some examples, the content (selected for presentation via the first client device) may correspond to a first content item, such as at least one of an article, a video, an audio file, an image, a web page, an advertisement, an email, a message, a content suggestion, etc., selected for presentation via the first client device. For example, responsive to selecting the first content item for presentation via the first client device, the first content item may be transmitted to the first client device. The first content item may be displayed via the first client device. Alternatively and/or additionally, in an example where the first content item comprises audio, the audio may be played via the first client device (e.g., the audio may be output via a speaker associated with the first client device).

In some examples, the first content item may be selected for presentation via the first client device responsive to receiving a first request for presentation of a content item via the first client device. The first request for content may be received responsive to the first client device accessing a second internet resource associated with the content system. For example, the first client device may transmit a request to access the second internet resource to a server associated with the second internet resource. Responsive to receiving the request to access the second internet resource, the server associated with the second internet resource may transmit the first request for content to the content system (and/or to a server associated with the content system). Alternatively and/or additionally, the first request for content may be received from the first client device. In some examples, the first request for content may correspond to a request to be provided with a content item (e.g., an advertisement, an image, a link, a video, etc.) for presentation via the second internet resource.

In some examples, responsive to receiving the first request for content, the first content item may be selected from a second plurality of content items. In an example where the first request for content is a request for an advertisement, responsive to receiving the first request for content, a bidding process may be performed to select a content item from the second plurality of content items (e.g., the second plurality of content items may be participating in an auction for selection of a content item to present via the first client device). In some examples, the second plurality of content items may comprise the first content item.

In some examples, a first plurality of content item scores associated with the second plurality of content items may be determined. In some examples, the first plurality of content item scores may comprise a first content item score associated with the first content item. For example, a content item score of the second plurality of content items scores may correspond to a probability of receiving a selection of a content item responsive to presenting the content item via the first client device. Alternatively and/or additionally, a content item score of the second plurality of content items scores may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device.

In an example, the second plurality of content items comprises advertisements and/or the first content item is an advertisement selected from the second plurality of content items for presentation via the first client device. In the example, the first content item score associated with the first content item may correspond to a probability of receiving a selection of the first content item (e.g., an advertisement click) responsive to presenting the first content item via the first client device. Alternatively and/or additionally, the first content item score associated with the first content item may correspond to a probability of the first client device performing a conversion event associated with the first content item (e.g., purchasing a product and/or a service advertised by the first content item) after the first content item is presented via the first client device.

In an example, the second plurality of content items comprises audio files (e.g., at least one of songs, podcasts, etc.) and/or the first content item is an audio file selected from the second plurality of content items for presentation via the first client device. In the example, the first content item score associated with the first content item may correspond to a probability of receiving a positive signal responsive to presenting the first content item via the first client device (e.g., the positive signal may correspond to a selection of a selectable input associated with adding the first content item to a playlist and/or marking the first content item as a favorite and/or liked audio file, etc.). Alternatively and/or additionally, the first content item score associated with the first content item may correspond to a probability of the first user being interested in the first content item (and/or enjoying listening to the first content item). Alternatively and/or additionally, the first content item score associated with the first content item may correspond to a probability of at least a threshold proportion of the first content item being played via the first client device (and/or consumed by the first user), such as before playback of the first content item is stopped.

In an example, the second plurality of content items comprises videos (e.g., at least one of video clips, movies, shows, news segments, etc.) and/or the first content item is a video selected from the second plurality of content items for presentation via the first client device. In the example, the first content item score associated with the first content item may correspond to a probability of receiving a positive signal responsive to presenting the first content item via the first client device (e.g., the positive signal may correspond to a selection of a selectable input associated with marking the first content item as a favorite and/or liked video, etc.). Alternatively and/or additionally, the first content item score associated with the first content item may correspond to a probability of the first user being interested in the first content item (and/or enjoying watching the first content item). Alternatively and/or additionally, the first content item score associated with the first content item may correspond to a probability of at least a threshold proportion of the first content item being displayed (and/or consumed by the first user), such as before playback of the first content item is stopped.

In an example, the second plurality of content items comprises content suggestions (e.g., links to content such as at least one of an article, a video, an audio file, an image, a web page, an advertisement, etc.) and/or the first content item is a content suggestion selected from the second plurality of content items for presentation via the first client device. For example, the first content item may comprise a link to suggested content (e.g., at least one of a suggested article, a suggested video, a suggested audio file, a suggested image, a suggested web page, a suggested advertisement, etc.). In the example, the first content item score associated with the first content item may correspond to a probability of receiving a selection of the first content item and/or the first client device accessing the suggested content responsive to presenting the first content item via the first client device. Alternatively and/or additionally, the first content item score associated with the first content item may correspond to a probability of the first user being interested in the suggested content. Alternatively and/or additionally, the first content item score associated with the first content item may correspond to a probability of at least a threshold proportion of the suggested content being presented by the first client device and/or consumed by the first user.

The first plurality of content item scores may be determined based upon content item information associated with the second plurality of content items and/or the first user profile associated with the first client device (and/or associated with the first user account). For example, the first plurality of content item scores may be determined based upon the first supplemental feature information and/or other information of the modified first user profile. For example, the first supplemental feature information may be indicative of one or more features (e.g., features corresponding to at least one of content item interactions, selected content items, accessed web pages, etc.) and/or one or more weights associated with the one or more features. The first supplemental feature information may be indicative of information associated with the one or more features, such as at least one of a topic associated with the feature (e.g., one or more topics associated with content corresponding to the feature), a type of content (e.g., a type of content, such as at least one of audio, video, image, etc., of content corresponding to the feature), an advertiser associated with the feature (e.g., an advertiser using content corresponding to the feature to promote one or more products and/or one or more services), an artist associated with the feature, an author associated with the feature, a company associated with the feature, a brand associated with the feature, an organization associated with the feature, a publisher associated with the feature, a platform associated with the feature (e.g., a platform on which content corresponding to the feature is at least one of accessed, interacted with, selected, etc.), etc.

In an example, the first content item score, of the first plurality of content item scores, associated with the first content item may be determined based upon the first supplemental feature information and/or first content information associated with the first content item. The first content information may be indicative of at least one of one or more topics associated with the first content item (such as at least one of a type of product and/or a type of service in an example where the first content item is an advertisement of a product corresponding to the type of product and/or a service corresponding to the type of service, "nature" in an example where the first content item is a nature documentary, etc.), a type of content of the first content item (such as at least one of "advertisement image" in an example where the first content item is an advertisement banner, "video" in an example where the first content item is a video, "news article" in an example where the first content item is a news article, etc.), an advertiser associated with the first content item, an artist associated with the first content item (e.g., an artist, such as at least one of a singer, a band, an illustrator, etc. that created the first content item), an author associated with the first content item, a company associated with the first content item, a brand associated with the first content item, an organization associated with the first content item, a publisher associated with the first content item, etc.

In some examples, the first content item score may be determined based upon one or more similarities of the first content item to one or more second features of the one or more first supplemental features of the first supplemental information and/or one or more second weights associated with the one or more second features. For example, the one or more similarities of the first content item to the one or more second features may be determined based upon the one or more topics associated with the first content item matching one or more topics associated with content corresponding to one or more features of the one or more second features. Alternatively and/or additionally, the one or more similarities of the first content item to the one or more second features may be determined based upon the first content item matching one or more features of the one or more second features (e.g., the one or more features may correspond to the first content item). Alternatively and/or additionally, the one or more similarities of the first content item to the one or more second features may be determined based upon the type of content of the first content item matching one or more types of content corresponding to one or more features of the one or more second features. Alternatively and/or additionally, the one or more similarities of the first content item to the one or more second features may be determined based upon the advertiser associated with the first content item matching one or more advertisers associated with content corresponding to one or more features of the one or more second features. Alternatively and/or additionally, the one or more similarities of the first content item to the one or more second features may be determined based upon the publisher, the artist and/or the author associated with the first content item matching one or more publishers, one or more artists and/or one or more authors associated with content corresponding to one or more features of the one or more second features. Alternatively and/or additionally, the one or more similarities of the first content item to the one or more second features may be determined based upon the company, the brand and/or the organization associated with the first content item matching one or more companies, one or more brands and/or one or more organizations associated with content corresponding to one or more features of the one or more second features.

In some examples, the first content item score may be determined based upon the one or more second weights. In an example, the one or more similarities of the first content item to the one or more second features may comprise a first similarity of the first content item to a third feature of the one or more second features. The one or more second weights may comprise a third weight associated with the third feature. In some examples, one or more operations (e.g., mathematical operations) may be performed using the first similarity and/or the third weight (and/or one or more other similarities of the one or more similarities and/or one or more other weights of the one or more second weights) to determine the first content item score. In some examples, a higher weight of the third weight may correspond to a higher content item score of the first content item score.

In some examples, the first content item may be selected from the second plurality of content items for presentation via the first client device based upon the first plurality of content item scores. For example, the first content item may be selected from the second plurality of content items based upon a determination that a first content item score associated with the first content item exceeds a threshold content item score. Alternatively and/or additionally, the first content item may be selected from the second plurality of content items based upon a determination that the first content item score is greater than one or more other content item scores of the first plurality of content item scores. Alternatively and/or additionally, the first content item may be selected from the second plurality of content items based upon a determination that the first content item score is a highest content item score of the first plurality of content item scores.

In some examples, such as in an example where the first request for content is a request for an advertisement, a first plurality of bid values associated with the second plurality of content items may be determined. In some examples, the first plurality of bid values may be determined based upon budgets (e.g., daily budgets) and/or target spend patterns associated with the second plurality of content items. For example, the first plurality of bid values and/or the budgets may be received from devices associated with the second plurality of content items (e.g., devices associated with advertisers, companies, brands, organizations, etc. associated with the second plurality of content items). In some examples, the first plurality of bid values may comprise a first bid value associated with the first content item. In some examples, the first content item may be selected for presentation via the first client device based upon the first plurality of bid values and/or the first plurality of content item scores.

In some examples, the first content item may be transmitted to the first client device responsive to selecting the first content item for presentation via the first client device. The first content item may be presented via the first client device. For example, the first content item may be presented via the second internet resource on the first client device, such as while the second internet resource is accessed and/or displayed.

Figure 5G:
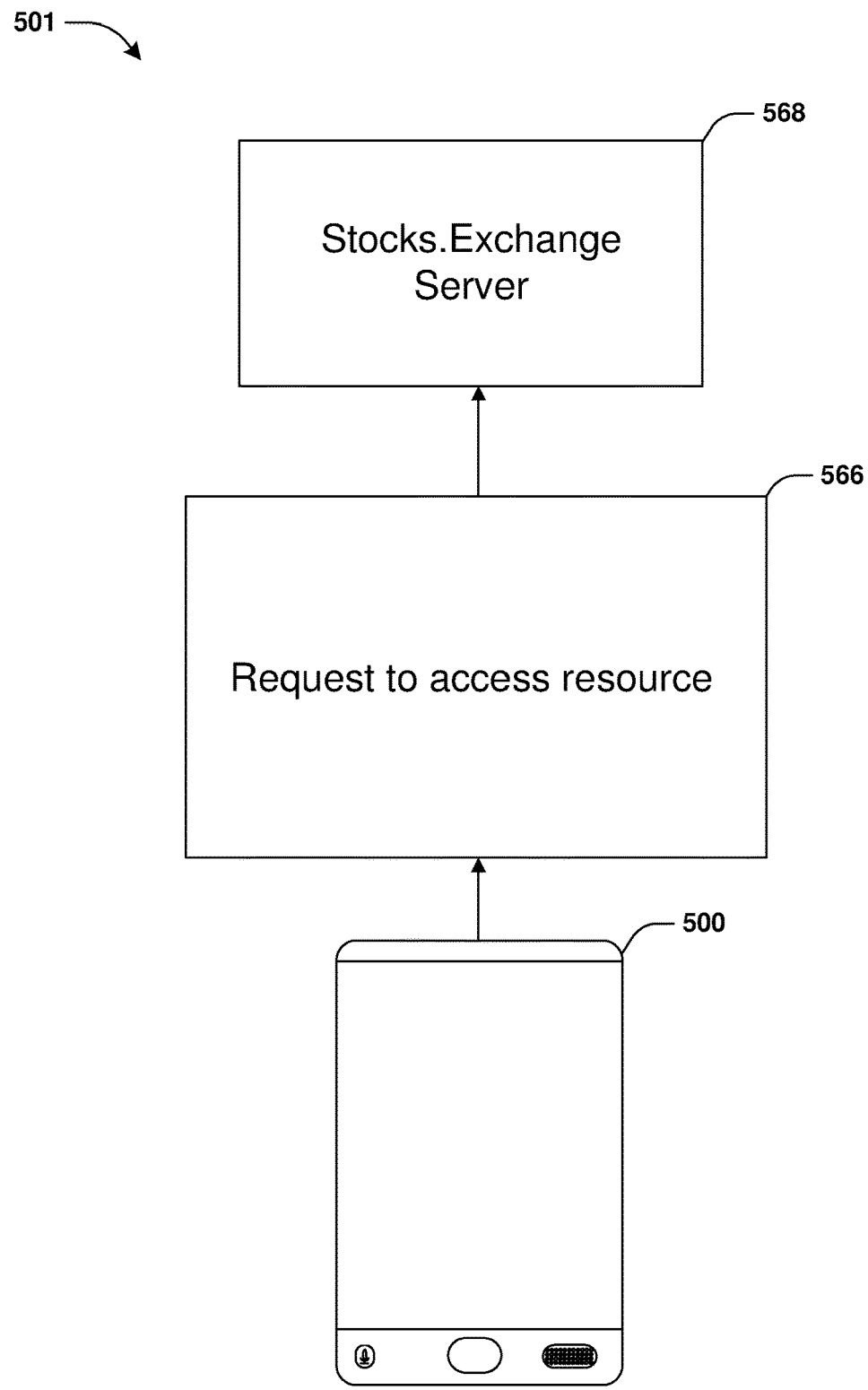
FIG. 5G is a component block diagram illustrating an example system for generating a similarity profile and/or modifying a user profile based upon the similarity profile, where a first client device transmits a request to access a resource to a server.
Figure 5H:
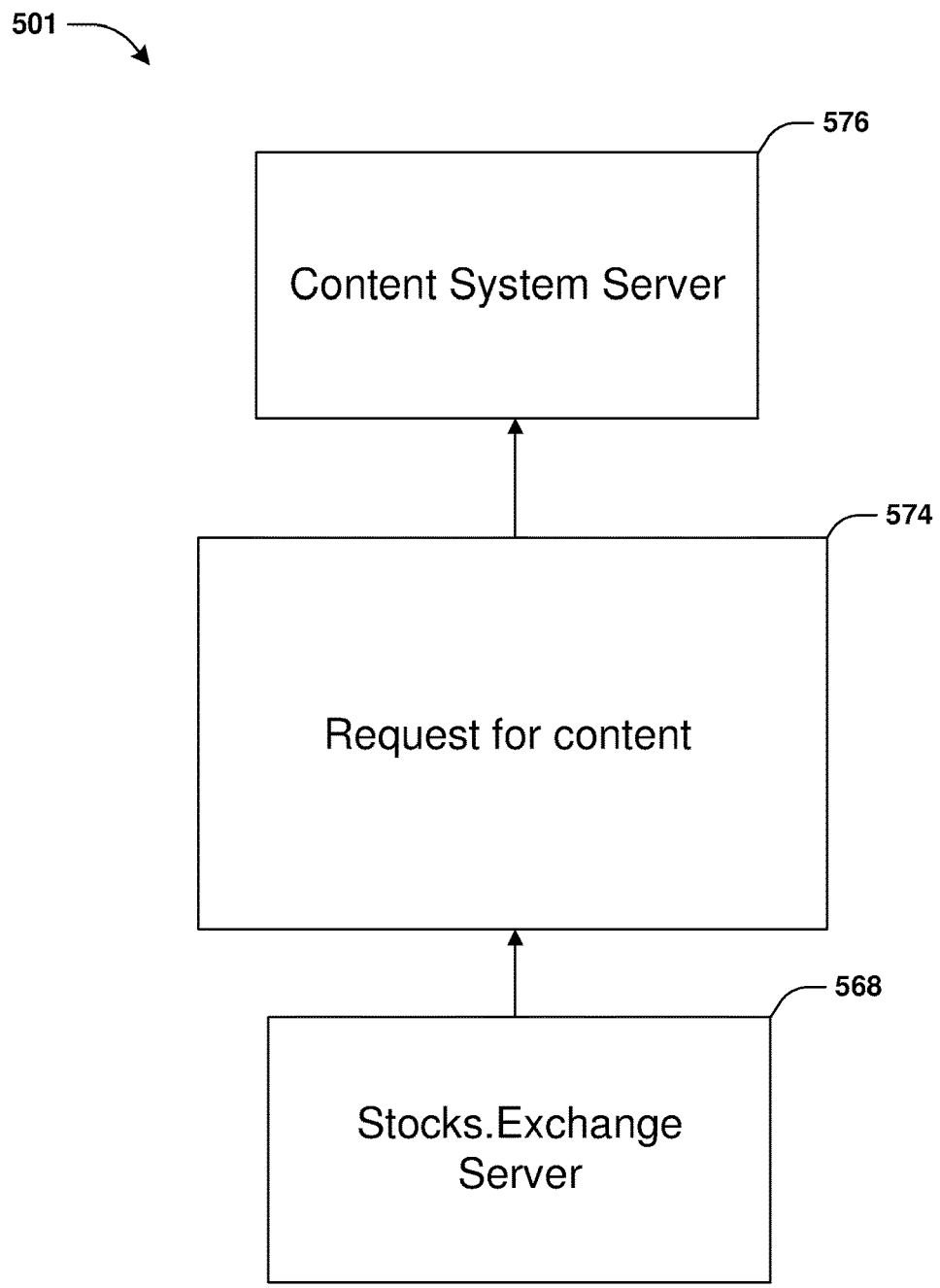
FIG. 5H is a component block diagram illustrating an example system for generating a similarity profile and/or modifying a user profile based upon the similarity profile, where a first server transmits a first request for content to a second server associated with a content system.
Figure 5I:
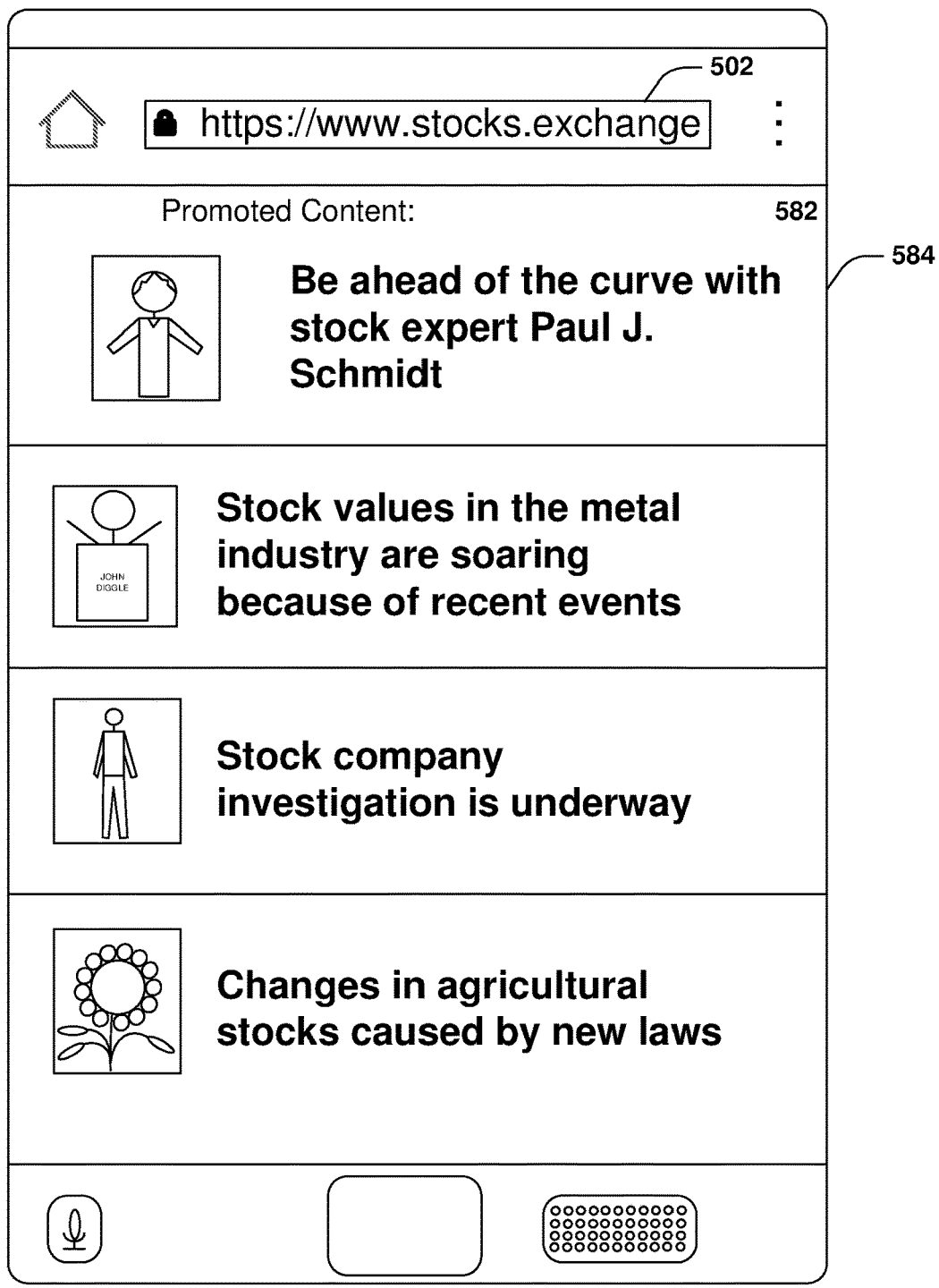
FIG. 5I is a component block diagram illustrating an example system for generating a similarity profile and/or modifying a user profile based upon the similarity profile, where a first client device presents and/or accesses a seventh web page.

FIGS. 5G-5I illustrate an exemplary scenario in which the first content item (shown with reference number 584 in FIG. 5I) is selected and/or presented via the first client device 500. FIG. 5G illustrates the first client device 500 transmitting a request 566 to access a resource to a first server 568. In some examples, the request 566 to access the resource may be transmitted responsive to a selection of a selectable input (such as a link) corresponding to a seventh web page 582 (shown in FIG. 5I). For example, the resource may correspond to the seventh web page 582. The request 566 to access the resource may comprise an indication of the seventh web page 582 (e.g., a web address "https://stocks.exchange.com" of the seventh web page 582). Alternatively and/or additionally, the first server 568 may be associated with the seventh web page 582.

FIG. 5H illustrates the first server 568 transmitting the first request for content (shown with reference number 574) to a second server 576 associated with the content system. In some examples, the first request for content 574 may be transmitted (by the first server 568) responsive to receiving the request 566 to access the resource. Alternatively and/or additionally, the first request for content 574 may be transmitted (to the second server 538) by the first client device 500. In some examples, the first request for content 574 may be a request to be provided with a content item (e.g., an advertisement, an image, a link, a video, etc.) for presentation via the seventh web page 582.

In some examples, responsive to receiving the first request for content 574, the first content item 584 may be selected from the second plurality of content items, such as using one or more of the techniques presented herein. Responsive to selecting the first content item 584 for presentation via the first client device 500, the first content item 584 may be transmitted to the first client device 500 for presentation via the seventh web page 582. FIG. 5I illustrates the first client device 500 presenting and/or accessing the seventh web page 582 using the browser. For example, the content system may provide the first content item 584 to be presented via the seventh web page 582 while the seventh web page 582 is accessed by the first client device 500.

In some embodiments of the present disclosure, user activity of a first plurality of users may be analyzed to determine a first plurality of sets of event information associated with a first plurality of events of the user activity. The first plurality of sets of event information may be determined using one or more of the techniques described herein. The first plurality of events may be associated with a first plurality of entities, such as described in the foregoing description. In an example, the first plurality of entities may correspond to at least one of internet resources, terms, web addresses, content items, queries, emails, email accounts, social media posts, social media accounts, etc., such as described in the foregoing description. The user activity may comprise a first set of user activity associated with a first user of the first plurality of users. In an example, the first set of user activity may be performed using one or more client devices associated with the first user. The first set of user activity (e.g., performed by the first user) may comprise a first event of the first plurality of events. A first set of event information of the first plurality of sets of event information is associated with the first event. The first set of event information may be indicative of the first user and/or a first entity, of the first plurality of entities, associated with the first event. In an example, the first set of event information may comprise user identification information indicative of the first user, such as at least one of a device identifier associated with a client device of the first user, a username associated with a user account of the first user, a browser cookie, etc. A first network profile (e.g., a bipartite graph, such as corresponding to the representation 524 shown in FIG. 5D) associated with the first plurality of users and the first plurality of entities may be generated based upon the first plurality of sets of event information, such as using one or more of the techniques described herein. The first network profile is indicative of one or more first sets of event metrics associated with the first user and one or more first entities, of the first plurality of entities, comprising the first entity. A first set of event metrics of the one or more first sets of event metrics corresponds to a measure of activity associated with the first user and the first entity, such as described in the foregoing description. A first similarity profile associated with the first user may be generated based upon the first network profile, such as using one or more of the techniques described herein. The first similarity profile may correspond a one-mode projection of the first network profile, such as corresponding to the representation 546 shown in FIG. 5E. The first similarity profile is indicative of one or more first users, of the first plurality of users, wherein each user of the one or more first users is associated with an entity of the one or more first entities. For example, each user of the one or more first users may be related to the first user in that each of the one or more first users performed activity associated with at least one entity of the one or more first entities. The first similarity profile is indicative of one or more first similarity scores associated with the first user, wherein a first similarity score of the one or more first similarity scores corresponds to a similarity of the first user to a second user of the one or more first users. The one or more first similarity scores may be generated using one or more of the techniques described herein. A first user profile associated with the first user may be generated based upon the first similarity profile and one or more first user profiles associated with the one or more first users that are related to the first user. In an example, supplemental feature information, from at least one of the one or more first user profiles, may be added to a user profile associated with the first user to generate the first user profile. The supplemental feature information may be determined based upon the first similarity profile using one or more of the techniques described herein. In an example, the supplemental feature information may correspond to features comprising content item selections (e.g., advertisement clicks) and/or other types of features. Content may be selected for presentation to the first user based upon the first user profile, such as using one or more of the techniques described herein. For example, the content may be selected based upon the supplemental feature information and/or other information of the first user profile (e.g., the content may comprise an advertisement and may be selected based upon a click probability, associated with the advertisement, that is determined using the supplemental feature information of the first user profile). For example, the content may be selected responsive to receiving a request for content (e.g., an advertisement request) associated with the first user.

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, a more accurate determination of content item scores (e.g., as a result of determining one or more similarity scores associated with one or more other client devices, as a result of including supplemental feature information, from one or more user profiles associated with the one or more other client devices, in a first user profile associated with the client device to generate a modified user profile having more information than the first user profile, as a result of determining content item scores associated with content items based upon the modified user profile that has more information than the first user profile, etc.).

Alternatively and/or additionally, implementation of the disclosed subject matter may lead to benefits including an increase in generalized revenue for presenting content items via client devices (e.g., as a result of accurately determining content item scores associated with content items using the modified user profile that has more information than the first user profile, as a result of selecting one or more content items for presentation via the client device based upon the content item scores, where a probability of receiving a positive signal responsive to presentation of a selected content item (e.g., an advertisement click, a conversion event, etc.), and/or a probability of receiving revenue as a result of the positive signal, are increased due to the accurate determination of the content item scores).

Alternatively and/or additionally, implementation of at least some of the disclosed subject matter may lead to benefits including a reduction in screen space and/or an improved usability of a display (e.g., of the client device) (e.g., as a result of enabling the user of the client device to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including a more accurate and precise control of transmission of content items to intended users (e.g., as a result of more accurately determining content item scores associated with content items using the modified user profile that has more information than the first user profile, as a result of selecting one or more content items for presentation via the client device based upon the content item scores, etc.).

Alternatively and/or additionally, implementation of at least some of the disclosed subject matter may lead to benefits including about a 15% (and/or a different percentage) increase in an amount of user information available to a system for providing one or more services, such as selecting and/or providing content (e.g., feature information and/or coverage of the user profile database may increase by about 15% or a different percentage).

Alternatively and/or additionally, implementation of at least some of the disclosed subject matter may lead to benefits including about a 1% (and/or a different percentage) increase in revenue received as a result of selecting and/or presenting content items using one or more of the techniques presented herein.

Alternatively and/or additionally, implementation of at least some of the disclosed subject matter may lead to benefits including about a 1% (and/or a different percentage) increase in click through rates associated with content selected and/or presented using one or more of the techniques presented herein.

In some examples, at least some of the disclosed subject matter may be implemented on a client device, and in some examples, at least some of the disclosed subject matter may be implemented on a server (e.g., hosting a service accessible via a network, such as the Internet).

Figure 6:
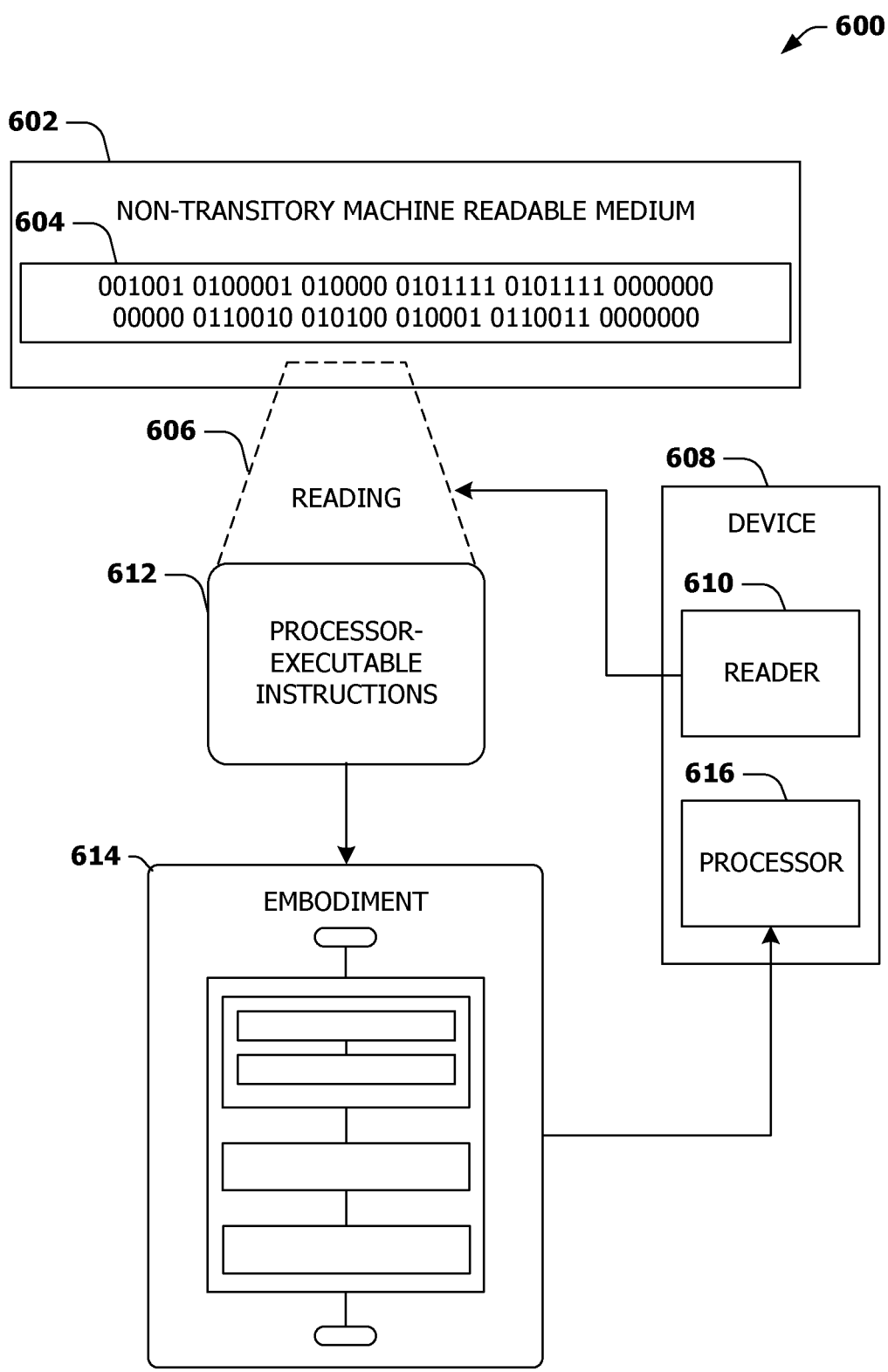
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    determining a first network profile associated with a first plurality of client devices and a first plurality of entities, wherein:
        the first network profile is indicative of one or more event metrics associated with a first client device and a first entity; and
        the one or more event metrics comprise at least one of a quantity of occurrences of a term of the first entity in web addresses of internet resources accessed by the first client device or a rate of occurrences of the term in web addresses of internet resources accessed by the first client device;
    generating, based upon the first network profile, a first similarity profile associated with the first client device, wherein the first similarity profile is indicative of:
        the first plurality of client devices; and
        a first similarity score corresponding to a similarity of the first client device to a second client device of the first plurality of client devices; and
    modifying, based upon the first similarity profile and a second user profile associated with the second client device, a first user profile associated with the first client device to generate a modified user profile.

2. The method of claim 1, wherein:
    the first network profile is indicative of one or more sets of event metrics associated with the second client device and one or more second entities, of the first plurality of entities, comprising the first entity;
    a set of event metrics of the one or more sets of event metrics corresponds to a measure of activity associated with the second client device and the first entity; and
    the generating the first similarity profile comprises determining the first similarity score based upon the one or more event metrics associated with the first client device and the one or more sets of event metrics associated with the second client device.

3. The method of claim 2, wherein:
    the modifying the first user profile to generate the modified user profile is performed based upon the second user profile associated with the second client device responsive to a determination that the first similarity score exceeds a threshold similarity score.

4. The method of claim 2, wherein:
    the modifying the first user profile to generate the modified user profile comprises:

identifying a first set of feature information, indicative of one or more first features associated with the second client device, within the second user profile associated with the second client device;

generating, based upon the first set of feature information and the first similarity score, a first set of supplemental feature information for inclusion in the first user profile; and including the first set of supplemental feature information in the first user profile to generate the modified user profile.

5. The method of claim 4, wherein:
the one or more first features correspond to one or more content items at least one of selected or accessed via the second client device.

6. The method of claim 2, wherein:
the one or more event metrics is indicative of at least one of:
   a rate at which events associated with the first client device and the first entity occur; or
   a quantity of events associated with the first client device and the first entity; and
the set of event metrics is indicative of at least one of:
   a rate at which events associated with the second client device and the first entity occur; or
   a quantity of events associated with the second client device and the first entity.

7. The method of claim 6, wherein:
the determining the first network profile is based upon a first plurality of sets of event information comprising:
   one or more first sets of event information indicative of one or more first events corresponding to the first client device accessing one or more first internet resources associated with the first entity; and
   one or more second sets of event information indicative of one or more second events corresponding to the second client device accessing one or more second internet resources associated with the first entity; and
the determining the first network profile comprises:
   determining the one or more event metrics based upon the one or more first sets of event information; and
   determining the set of event metrics based upon the one or more second sets of event information.

8. The method of claim 7, wherein:
each internet resource of the one or more first internet resources at least one of has a web address associated with the first entity or comprises content associated with the first entity; and
each internet resource of the one or more second internet resources at least one of has a web address associated with the first entity or comprises content associated with the first entity.

9. The method of claim 1, comprising:
selecting content for presentation via the first client device is performed responsive to receiving a first request for presentation of a content item via the first client device.

10. The method of claim 9, wherein the selecting content for presentation via the first client device comprises:
determining, based upon the modified user profile and content information associated with a first plurality of content items, a first plurality of content item scores associated with the first plurality of content items; and
selecting a first content item, from the first plurality of content items, for presentation via the first client device based upon the first plurality of content item scores, the method comprising:
transmitting the first content item to the first client device responsive to the selecting the first content item for presentation via the first client device.

11. A computing device comprising:
a processor; and
memory comprising processor-executable instructions that when executed by the processor cause performance of operations, the operations comprising:
   determining a first network profile associated with a first plurality of client devices and a first plurality of terms, wherein:
      the first network profile is indicative of one or more event metrics associated with a first client device and one or more first terms; and
      the one or more event metrics comprise at least one of a quantity of occurrences of a first term in web addresses of internet resources accessed by the first client device or a rate of occurrences of the first term in web addresses of internet resources accessed by the first client device;
   generating, based upon the first network profile, a first similarity profile associated with the first client device, wherein the first similarity profile is indicative of:
      the first plurality of client devices; and
      a first similarity score corresponding to a similarity of the first client device to a second client device of the first plurality of client devices; and
   modifying, based upon the first similarity profile and a second user profile associated with the second client device, a first user profile associated with the first client device to generate a modified user profile.

12. The computing device of claim 11, wherein:
the first network profile is indicative of one or more sets of event metrics associated with the second client device and one or more third terms, of the first plurality of terms, comprising the first term;
a set of event metrics of the one or more sets of event metrics corresponds to a measure of activity associated with the second client device and the first term; and
the generating the first similarity profile comprises determining the first similarity score based upon the one or more event metrics associated with the first client device and the one or more sets of event metrics associated with the second client device.

13. The computing device of claim 12, wherein:
the modifying the first user profile to generate the modified user profile is performed based upon the second user profile associated with the second client device responsive to a determination that the first similarity score exceeds a threshold similarity score.

14. The computing device of claim 12, wherein:
the modifying the first user profile to generate the modified user profile comprises:
   identifying a first set of feature information, indicative of one or more first features associated with the second client device, within the second user profile associated with the second client device;
   generating, based upon the first set of feature information and the first similarity score, a first set of supplemental feature information for inclusion in the first user profile; and
   including the first set of supplemental feature information in the first user profile to generate the modified user profile.

15. The computing device of claim 14, wherein:
the one or more first features correspond to one or more content items at least one of selected or accessed via the second client device.

16. The computing device of claim 12, wherein:
the set of event metrics is indicative of at least one of:
    a rate of occurrences of the first term in web addresses of internet resources accessed by the second client device; or
    a quantity of occurrences of the first term in web addresses of internet resources accessed by the second client device.

17. The computing device of claim 16, wherein:
the determining the first network profile is based upon a first plurality of sets of event information comprising:
    one or more first sets of event information indicative of one or more first events corresponding to the first client device accessing one or more first internet resources associated with the first term; and
    one or more second sets of event information indicative of one or more second events corresponding to the second client device accessing one or more second internet resources associated with the first term; and
the determining the first network profile comprises:
    determining the one or more event metrics based upon the one or more first sets of event information; and
    determining the set of event metrics based upon the one or more second sets of event information.

18. The computing device of claim 17, wherein:
each internet resource of the one or more first internet resources has a web address comprising the first term; and
each internet resource of the one or more second internet resources has a web address comprising the first term.

19. The computing device of claim 12, the operations comprising:
    receiving a first request for presentation of a content item via the first client device;
    responsive to receiving the first request, selecting, based upon the modified user profile, a first content item for presentation via the first client device; and
    transmitting the first content item to the first client device responsive to the selecting the first content item for presentation via the first client device.

20. A non-transitory machine readable medium having stored thereon processor-executable instructions that when executed cause performance of operations, the operations comprising:
    determining a first network profile associated with a first plurality of users and a first plurality of entities, wherein:
        the first network profile is indicative of one or more event metrics associated with a first user and a first entity; and
        the one or more event metrics comprise at least one of a quantity of occurrences of a term of the first entity in web addresses of internet resources accessed by the first user or a rate of occurrences of the term in web addresses of internet resources accessed by the first user;
    generating, based upon the first network profile, a first similarity profile associated with the first user, wherein the first similarity profile is indicative of:
        the first plurality of users; and
        a first similarity score corresponding to a similarity of the first user to a second user of the first plurality of users; and
    generating, based upon the first similarity profile and a second user profile associated with the second user, a first user profile associated with the first user.

* * * * *